(12) United States Patent
Tyrrell et al.

(10) Patent No.: US 11,133,623 B2
(45) Date of Patent: Sep. 28, 2021

(54) WET CONTACT DETECTION IN EXTERNAL ACCESSORY CONNECTOR

(71) Applicant: Dialog Semiconductor (UK) Limited, London (GB)

(72) Inventors: Julian Tyrrell, Swindon (GB); Andrew Repton, Swindon (GB); Gary Hague, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 5 days.

(21) Appl. No.: 16/270,845

(22) Filed: Feb. 8, 2019

(65) Prior Publication Data

US 2020/0259298 A1     Aug. 13, 2020

(51) Int. Cl.
    *H01R 13/66*     (2006.01)
    *G01N 27/07*     (2006.01)
    *H01R 13/70*     (2006.01)

(52) U.S. Cl.
    CPC ......... *H01R 13/6683* (2013.01); *G01N 27/07* (2013.01); *H01R 13/70* (2013.01)

(58) Field of Classification Search
    CPC ........... H01R 13/6683; H01R 2107/00; H01R 24/60; H01R 13/52; H01R 13/6675; H01R 13/703; H01R 13/713; H01R 29/00; H01R 13/70; G01R 27/14; G01R 31/50; G01R 31/52; G01R 31/66; G01R 31/68;

(Continued)

(56) References Cited

U.S. PATENT DOCUMENTS 7,161,491 B2    1/2007   Garcia et al.
9,030,208 B2    5/2015   Shoykhet et al.
(Continued)

FOREIGN PATENT DOCUMENTS

EP        3196770       7/2017

OTHER PUBLICATIONS

National Institute of Health Public Access, "Can Water Store Charge?," by Kate Ovchinnikova et al, Copyright: 2009 American Chemical Society, Langmuir Jan. 6, 2009: 25(1): 542-547. doi:10.1021/la802430k.

(Continued)

*Primary Examiner* — Tung X Nguyen
*Assistant Examiner* — Feba Pothen
(74) *Attorney, Agent, or Firm* — Saile Ackerman LLC; Stephen B. Ackerman; Billy Knowles

(57) ABSTRACT

A conductive liquid path detection circuit for detecting a conductive liquid present in a receptacle connector and/or a mating connector plug is configured for discharging an electron charge from any conductive liquid present on a connector pin in the receptacle connector and/or a mating connector plug. The conductive liquid path detection circuit charges any conductive liquid present on the connector pin with an electron charge. The circuit repeatedly samples and retains the samples of the measurements of a voltage level present at the connector pin. The conductive liquid path detection circuit then analyzes the samples of the measurements to determine a slope of the samples of the measurements of a voltage level over time; and determines when an amplitude of a final measurement of the voltage level is less than a conductive liquid detection threshold level.

49 Claims, 16 Drawing Sheets

(58) Field of Classification Search
CPC . G01R 31/69; G06F 13/4068; G06F 13/4081; G06F 13/4086; G06F 13/4282; G06F 2213/0042; G01N 27/07
See application file for complete search history.

(56) References Cited

U.S. PATENT DOCUMENTS

| | | |
|---|---|---|
| 9,609,447 B2 | 3/2017 | Miske et al. |
| 9,823,286 B2 | 11/2017 | Connell et al. |
| 10,107,709 B2 | 10/2018 | Vilbrandt et al. |
| 2017/0248641 A1 | 8/2017 | Shi et al. |
| 2017/0272877 A1 | 9/2017 | Roh |
| 2017/0358922 A1* | 12/2017 | Bacon ................ H01R 13/6683 |
| 2018/0062325 A1 | 3/2018 | Kim |
| 2018/0088067 A1* | 3/2018 | Gupta ................... G01R 31/69 |
| 2019/0079130 A1* | 3/2019 | Ko ......................... G01R 31/50 |

OTHER PUBLICATIONS

Universal Serial Bus Type-C Cable and Connector Specification, Release 1.3, Jul. 14, 2017, Copyright 2017 USB 3.0 Promoter Group, Relevant sections: 4.3 Sideband Use (SBU) and 4.5 Configuration Channel.
German Office Action, File No. 10 2019 210 043.0, Applicant: Dialog Semiconductor (UK) Limited, dated Apr. 28, 2020, 7 pages.

\* cited by examiner

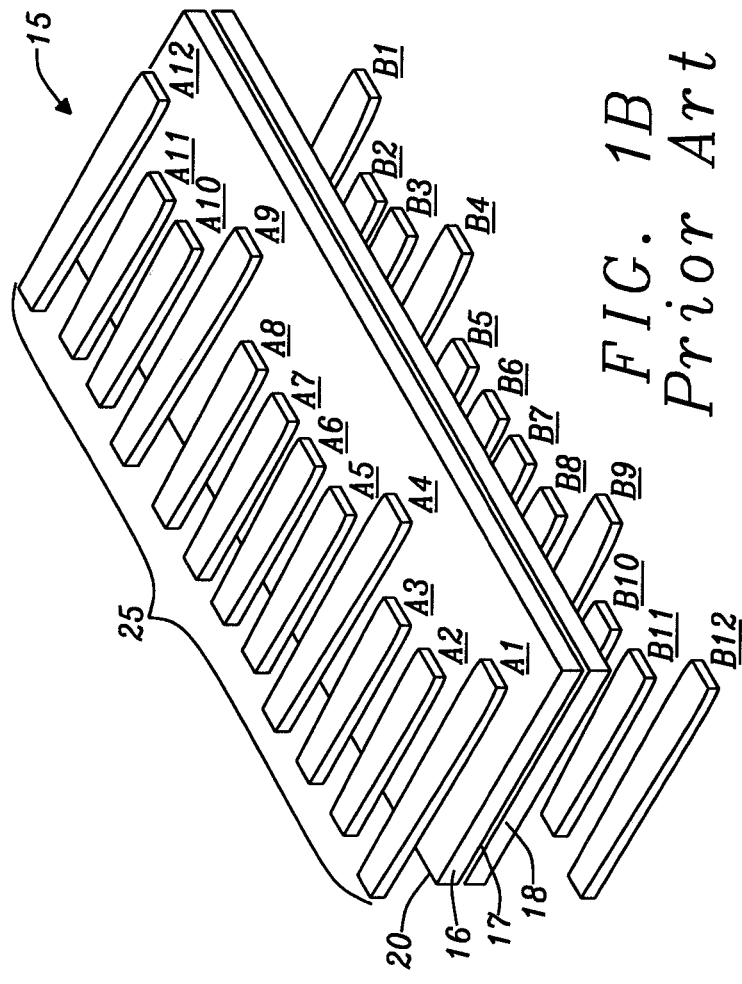
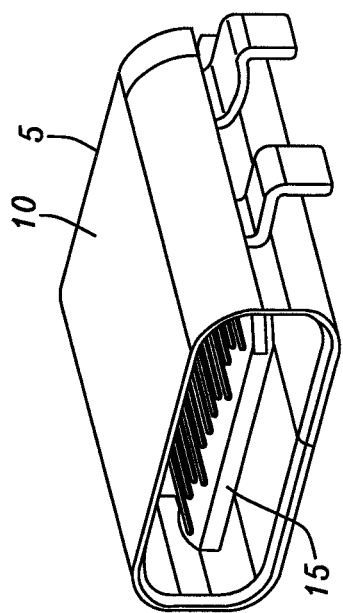
FIG. 1A Prior Art
FIG. 1B Prior Art
FIG. 1C Prior Art

WET CONTACT DETECTION IN EXTERNAL ACCESSORY CONNECTOR

TECHNICAL FIELD

This disclosure relates generally to circuits and methods for detection of a leakage conduction path in a receptacle connector. Further, this disclosure relates to circuits and methods for detection of a leakage conduction path where the leakage path is a liquid (water) with impurities (dirt, sweat, etc.) to aid the conduction of electricity. Further, this disclosure relates to circuits and methods for detection of a leakage conduction path where the receptacle connector is an accessory connector such as a Universal Serial Bus (USB) connector on a mobile device.

BACKGROUND

Water ingress in receptacle connectors such as a USB Type-C socket can cause problems with corrosion of the connections. This is caused by the system electronics supplying voltages on the connector pins and the conduction of the water causing electrolysis which damages the metal.

"Can water store charge?" Ovchinnikova et al., National Center for Biotechnology Information, U.S. National Library of Medicine, January 2009 describes that electrolytic processes in pure water are commonly ascribed to the following sequence of events: current flow, electrode polarization, interfacial double-layer formation around the electrodes, and establishment of equilibrium. The charge carriers responsible for this sequence include negatively charged OH groups, protons, hydronium ions, and perhaps larger scale charged clusters. The region next to the anode develops an extremely low pH, while the region next to the cathode develops an extremely high pH. It is reported in Ovchinnikova et al. that the zones of high and low pH correspond, respectively, to regions of net negative and positive charge.

Current techniques for detection of water within a connector apply a voltage across one or more terminals, either in parallel or sequentially, and measure the leakage resistance in a DC manner, when the value has settled. Once the leakage resistance threshold has been passed, a detection signal is provided for informing a user and the connector is 'turned off' to prevent any electrolytic corrosion from occurring A periodic check of the leakage resistance is made to confirm that the leakage resistance still exists. When the leakage resistance is greater than the resistance threshold thus indicating that the water is no longer within the connector, the connector interface is restored.

FIG. 1A is a drawing of a USB Type-C Dual-Row SMT Right Angle Receptacle similar to that shown in FIG. 3-5 on page 41 of the Universal Serial Bus Type-C Cable and Connector Specification of the prior art and is an example of a connector used for this disclosure. The Universal Serial Bus Type-C receptacle Connector 5 is a 24-pin connector system that has rotationally-symmetrical connector configured such that a plug connector is connected to the receptacle connector 5 in either orientation. The receptacle connector 5 has a shell 10 that may be metal or plastic. In some configurations, the shell 10 may be eliminated. The shell 10, as shown, is configured to be secured to a surface mount printed circuit board (not shown). Situated within the shell is a receptacle tongue 15. FIG. 1B is an exploded view of the receptacle tongue of the USB Type-C connector. The receptacle tongue 15 has a printed circuit board 20 formed of two layers 16 and 18 of glass-filled nylon. Between the two layers 16 and 18 of glass-filled nylon is a mid-plate 17 formed of stainless steel. The mid-plated 17 is connected to a ground reference voltage at least two points.

The top surface 16 and the bottom surface 18 each have a metal film adhered to them such that the metal film is etched to form the receptacle pins 25. In some embodiments, the receptacle pins 25 are formed of a powered metal deposited upon the top surface 16 and the bottom surface 18. The powered metal is then fused or melted to form the receptacle pins 16 and 18. The receptacle pins 16 and 18 metallurgy is selectively formed on appropriate materials based on performance requirements of the receptacle connectors. The receptacle pins 16 and 18 are plated with gold, nickel, and palladium.

The pattern of the receptacle pins 25 are duplicated and designated A1-A12 and B1-12 such that that the layout of the pins is rotationally symmetrical to allow the plug connector to be connected in either orientation. FIG. 1C is a diagram of the pin arrangements and functions of a USB Type-C Receptacle Interface of FIG. 2-1 page 21 of the Universal Serial Bus Type-C Cable and Connector Specification. The table provides the function code for each of the pins according to their pin designation A1-A12 and B1-12.

A device may be a host, referred to as a downstream-facing port (DFP) or a peripheral referred to as an upstream-facing port (UFP). Some devices such as mobile phones may assume either role depending on which type of port is detected at the opposite end. These devices are referred to dual-role-data ports (DRP). These configurations require that the devices have circuitry as defined in the "Universal Serial Bus Type-C Cable and Connector Specification, USB 3.0 Promoter Group, Release 1.3, Jul. 14, 2017 to determine the downstream-facing port (DFP) or the upstream-facing port (UFP). FIG. 2A is a schematic of a Source to Sink Functional Model as shown in FIG. 4-21 on page 170 of the Universal Serial Bus Type-C Cable and Connector Specification. FIG. 2A illustrates how the port alternates between UFP and DFP (Upstream Facing Port & Downstream Facing Port) by the signals applied to the Communication Connection ($CC_1$ and $CC_2$) pins. The $CC_1$ and $CC_2$ pins are also used to determine the orientation of the connection as the USB-C physical structure is symmetric and allows the plug to be mated with the receptacle in either direction.

FIG. 2B plots the timing of the alternating between source and sink operation of downstream-facing port (DFP) and the upstream-facing port (UFP) or Dual-Role Port (DRP) of FIG. 4-42 of page 200 of the Universal Serial Bus Type-C Cable and Connector Specification. The $CC_1$ and $CC_2$ pins switch between an 80 µA pull-up and 5.1 kΩ pull down at a nominal 75 ms cycle time.

SUMMARY

An object of this disclosure is to provide circuits and methods for detection of a leakage conduction path in a receptacle connector.

Further, an object of this disclosure is to provide circuits and methods for detection of a leakage conduction path where the leakage path is a liquid (water) with impurities (dirt, sweat, etc.) to aid the conduction of electricity.

Still further, an object of this disclosure is to provide circuits and methods for detection of a leakage conduction path where the receptacle connector is an accessory connector such as a Universal Serial Bus (USB) connector on a mobile device.

To accomplish at least one of these objects, a leakage conduction path detection circuit is configured to determine the presence of a conductive liquid such as water in a receptacle connector that has at least one connector pin with the receptacle connector. The leakage conduction path detection circuit is activated when a cable is connected between two electronic apparatus. The apparatus may each have a termination resistor or a pull up resistor on a source apparatus and a pulldown resistor on the sink apparatus. The termination resistors may be sufficiently large to be functionally equivalent to an open circuit or sufficiently small to be equivalent to the impedance of the cable between the apparatus.

The leakage conduction path detection circuit has a current sink connected for discharging an electrical charge from any water present within one or more pins of the receptacle connector and a current source connected for placing an electrical charge on any water present within the receptacle connector. A switch is connected between the current sink and one connector pin in the receptacle connector for selectively connecting the current sink to the connector pin in the receptacle connector for discharging any water present on the connector pin in the receptacle connector. A second switch is connected between the current source and the connector pin for selectively connecting the current source to the connector pin for charging the water present on the connector pin.

A voltage measurement circuit is connected to the connector pin in the receptacle connector in order to repetitively determine a voltage at the connector pin. A leakage path conduction alert controller circuit receives the voltage measurements from the voltage measurement circuit and retains these measurements for analysis. During the analysis, the leakage path conduction alert control circuit determines a slope based on the rate of change of the measured voltages present at the connector pin and a final voltage level to determine the presence of the water.

Prior to the beginning of a water-detection cycle, the first switch is activated to connect the current sink to the connector pin in the receptacle connector. At the start of the water-detection cycle, the leakage path conduction alert control circuit deactivates the first switch to disconnect the first current sink from the connector pin. The second switch is activated to connect the first current source to the connector pin. If there is no water present and there is no connection between the receptacle connector and the plug connector on the cable, the voltage rises approximately instantaneously to the voltage level of the power supply voltage source and the slope becomes zero. If the plug connector of the cable is inserted into the receptacle connector of the source apparatus and the sink apparatus has a pull down resistor, the measured voltage remains at essentially the voltage level of the reference voltage source or zero volts with a zero slope of the rate of change of the voltage.

When both the source apparatus and sink apparatus have termination resistors that have a sufficiently large resistance to approximate an open circuit, the first switch is activated to connect the first current sink to the connector for discharging any water present on the connector. The first switch is deactivated and the second switch is activated to connect the second current source to charge the water. If there is no water, the measured voltage rises instantaneously to the voltage level of the power supply voltage source as though connection appears as an open circuit. The slope of the rate of change of the voltage is then zero. If the slope of the rate of change of the measured voltage is not instantaneous and greater than zero with a maximum voltage level that is less than the water-detection threshold, the water is present in the receptacle connector.

In various embodiments, the source apparatus has a pull up resistor connected between the connector pin in the receptacle connector and the power supply voltage source and the sink apparatus has a pull down resistor connected between the plug connector and the ground reference. The leakage conduction path detection circuit has a second current source that provides a current that is larger than the current of the first current source. A third switch is connected between the second current source and the connector pin in the receptacle connector.

When leakage conduction path detection circuit is activated to determine if water is present on the connector pin in the receptacle connector, the first switch is deactivated to disconnect the connector pin from the pull down resistor. The second switch is activated to connect the first current source to the connector pin in the receptacle connector. When the plug connector is not connected to the receptacle connector, the measurement voltage rises instantaneously to the voltage level of the power supply voltage source and has a slope of the rate of change of the voltage of zero. When the plug connector is connected to the receptacle connector, the measurement voltage remains at to the voltage level of the reference voltage and has a rate of change of the voltage of zero.

When the plug connector is not connected to the receptacle connector and there is water on the connector pin in the receptacle connector, the measured voltage rate of change has a small slope from the voltage level of the ground reference voltage to the voltage level less than the voltage level of the water-detection threshold. When the plug connector is connected to the receptacle connector after the beginning of the water determining test, the second switch is deactivated and the third switch is activated to connect the second current source to the connector pin in the receptacle connector. When there is no water on the connector pin in the receptacle connector, the measured voltage rises instantaneously to the value that is determined by the voltage divider of the pull up resistor and the pull down resistor and the voltage across the pull down resistor determined by the second current source. The slope of the rate of change of the measured voltage is zero. When there is water on the connector pin in the receptacle connector, the measured voltage rises with a relatively large slope of the rate of change. The last measurement indicates that the voltage is approximately to that of the power supply voltage.

To verify the presence of the water, the third switch is deactivated to disconnect the second current source from the connector pin and the second switch is activated to connect the first current source to the connector pin. The voltage present at the connector pin begins to discharge. At the final voltage measurement, the voltage present at the connector pin in the receptacle connector is less than the voltage level of the water-detection threshold confirming the presence of the water. Subsequent to the final measurement time, the second switch is deactivated to disconnect the first current source from the connector pin and the first switch is activated to connect the current sink to the connector pin to discharge any water present at the connector pin.

In various embodiments, the receptacle connector and the connector plug comply with the USB Type C specification and the connector pins are configuration channel signal pins (CC1 and CC2) or the auxiliary signal pins for side band use (SBU1, SBU2).

In other embodiments that accomplish at least one of these objects, an electronic apparatus has at least one receptacle connector or connector plug and a leakage conduction path detection circuit connected to the at least one receptacle connector or connector plug. The leakage conduction path detection circuit is configured as described above.

In another embodiment that accomplishes at least these objects, a method for detecting water present in a receptacle connector and/or a mating connector plug begins with applying a current sink to a connector pin in the receptacle connector and/or the mating connector plug to discharge an electron charge from any water present. The current sink is deactivated and a first current source is applied to the connector terminal for charging the water present at the connector pin. The voltage present at the connector terminal is repeatedly measured and the voltage measurements are retained. An analysis is performed to determine a slope of a rate of change of the voltage measurements. When the slope of the rate of change of the measurement voltages is a zero value and the voltage level of all the voltage measurements is greater than a water-detection threshold voltage level, there is no water present and the method is completed.

When the slope of the rate of change of the measurement voltages is a zero value and the voltage level of all the voltage measurements is less than a water-detection threshold voltage level, a second current source is applied to the connector terminal. The second current source has a current level much greater than the first current source (80 µA vs 1 µA). The voltage at the connector pin in the receptacle connector is repetitively measured and the measurements are retained for analysis. When the slope of the rate of change is zero and the voltage level of the measurements of the connector terminal is greater than the water-detection threshold voltage level, there is no water present and the method ends. When the slope of the rate of change of the measurement voltages is much greater than zero and the measurement voltages are less than the water-detection threshold voltage level, water is present on the connector terminal.

In various embodiments, when water is detected in the connector pin in the receptacle connector, a second connector pin is tested to determine if water is present and to verify the water leakage detection. Once the detection of water has occurred for the one connector pin, the second current source is deactivated and the current sink is activated to discharge any water present on the second connector pin. When the water is discharged, the current sink is deactivated and the first current source is activated to charge the water. The voltage present on the second connector pin is measured multiple times and the measurements are retained for analysis. When the slope of the rate of change of the voltage measurements of the second connector pin is zero and the voltage measurements are greater than the water-detection threshold, no water is present and the method ends. When the slope of the rate of change of the voltage measurements of the second connector pin greater zero and the voltage measurements are less than the water-detection threshold, water is present at the first and second connector pins and the method ends.

BRIEF DESCRIPTION OF THE DRAWINGS

FIG. 1A is a drawing of a USB Type-C Dual-Row SMT Right Angle Receptacle similar to that shown in FIG. 3-5 on page 41 of the Universal Serial Bus Type-C Cable and Connector Specification.

FIGS. 1B and 1C are diagrams of the pin arrangements and functions of a USB Type-C Receptacle Interface of FIG. 2-1 page 21 of the Universal Serial Bus Type-C Cable and Connector Specification.

DETAILED DESCRIPTION

Figure 3A:
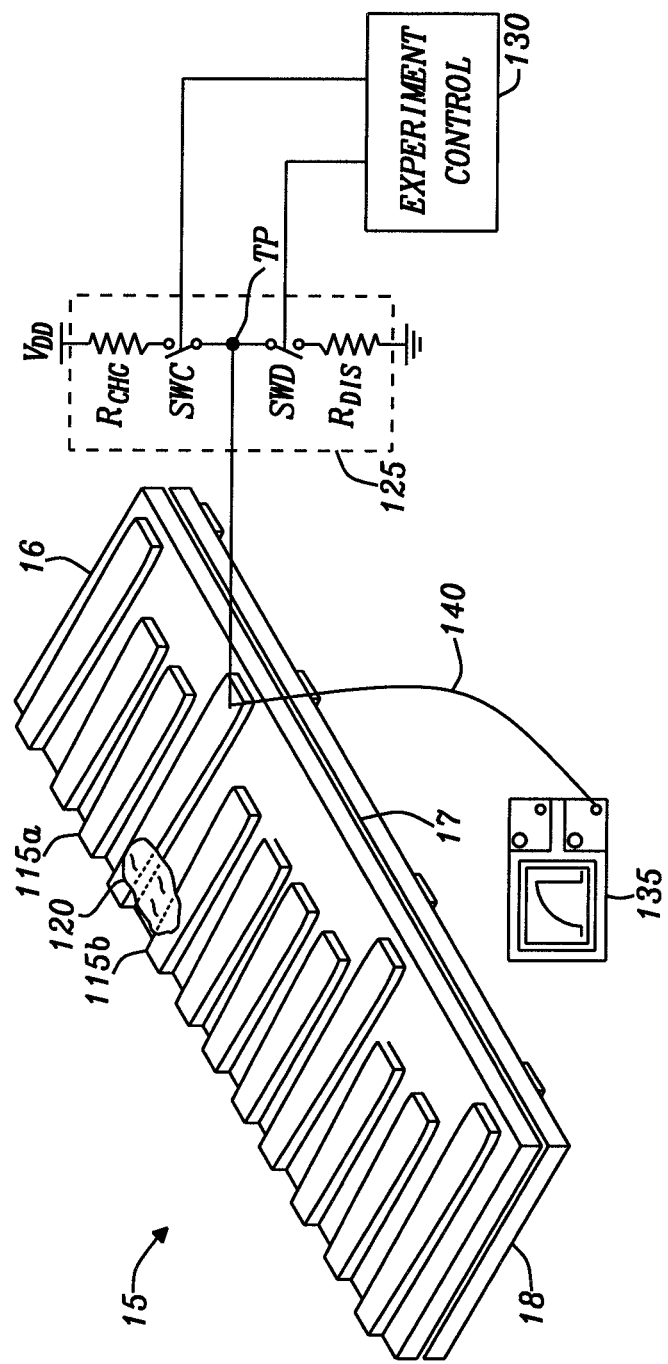
FIG. 3A is a diagram of a portion of a receptacle connector of a USB Type-C Connector having an area where water forms a leakage conduction path.

FIG. 3A is diagram of a receptacle tongue 100 of a receptacle connector of a USB Type-C Connector having an area of water 120 that forms a leakage conduction path and connected to a test circuit 125. The receptacle connector of the USB Type-C connector has a receptacle tongue 15 structured as described above and shown in FIG. 1A.

To verify that the principals of Ovchinnikova et al. are applicable to the present disclosure, a small amount of water 120 is placed on the receptacle pins 115a and 115b. The receptacle pins 115a and 115b that have the water 120 are connected to the test circuit 125 for discharging and charging the water 120. The test circuit 125 includes a discharge resistor $R_{DIS}$ having a one end connected to the ground reference voltage and a second end connected to a first terminal of a discharge switch SWD. A charge resistor $R_{CHG}$ has a one end connected to the power supply voltage source $V_{DD}$ and a second end connected to a first terminal of a charge switch SWC. The second ends of the discharge switch SWD and the charge switch SWC are connected to the test point TP. The test point TP is connected to the receptacle pin 115a that has the water 120 placed on it. A test probe 140 connected to between an oscilloscope 135 and the receptacle pin 115a with the water 120 placed on it for recording the voltage level developed at the receptacle ping 115a. A control circuit is connected to the control terminals of the discharge switch SWD and the charge switch SWC for alternately activating and deactivating the discharge switch SWD and the charge switch SWC for discharging and charging the water 120 placed on the receptacle pin 115a.

Figure 3B:
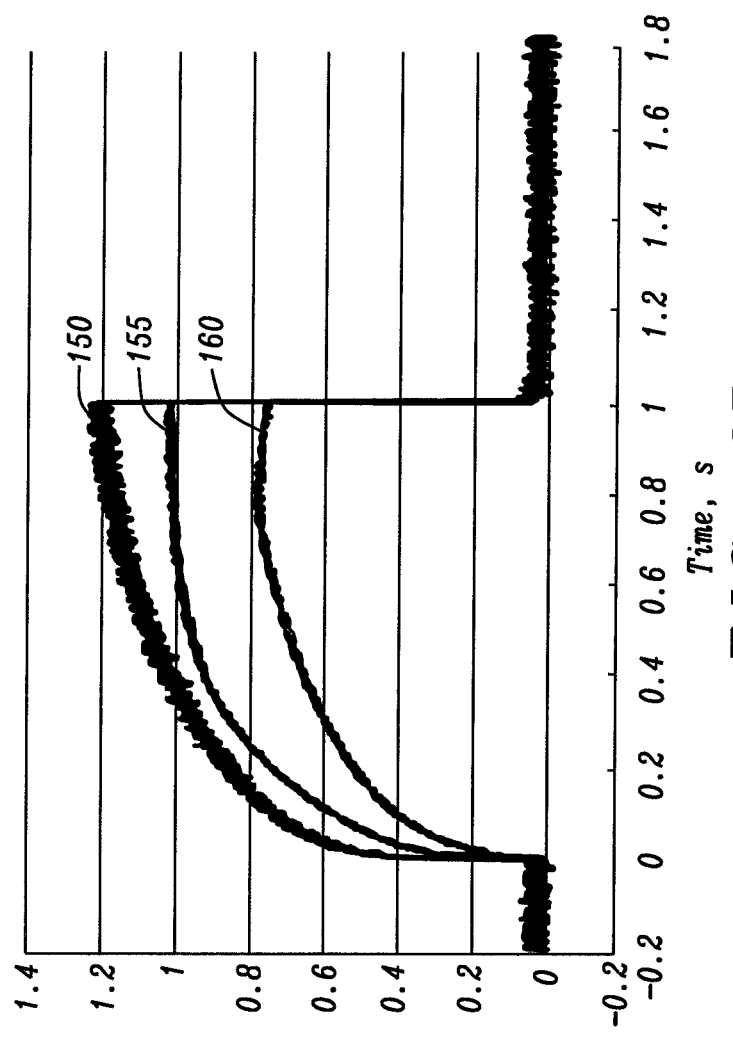
FIG. 3B presents plots of the voltage present at one of the receptacle connectors of a USB Type-C Connector having the area where water forms a leakage conduction path.

FIG. 3B presents plots of the voltage present at one of the receptacle connectors 115a of a USB Type-C receptacle tongue 100 having the area of water 120. In the experiment, the water tested was deionized, tap, and salt water. The tests begin prior to time 0 with the discharge switch SWD being activated and the test point TP being connected through the discharge resistor $R_{DIS}$ to ground. Any charge present on the water 120 on the receptacle pin 150a is discharged to zero volts (0.0V). The three plots 150, 155, and 160 illustrate a voltage level of zero volts (0.0V). At the time 0, the discharge switch SWD is deactivated and the charge switch SWC is activated connecting the test point TP through the charge resistor $R_{CHG}$ to the power supply voltage source $V_{DD}$.

The discharge resistor $R_{DIS}$ is has a resistance of 5.6 kΩ and the charge resistor $R_{CHG}$ has a resistance of 2.2 MΩ. The voltage level of the power supply voltage source $V_{DD}$ is 3.3V. The plot 150 shows the voltage and rise time of deionized water. The plot 155 shows the voltage and rise time for tap water. The plot 160 shows the voltage and rise time for salt water. The concentration of ions increases respectively. The actual ionic concentration is unknown but does show the trend of effects with impurity. As it can be seen, for this relatively low charging current through the 2.2 MΩ charge resistor $R_{CHG}$, the voltage increases at a slow rate, or effectively with a long time-constant. A key piece of information found in the experiment is that water conduction has a transient characteristic so that the instantaneous measurement of resistance varies. The experiment shows that this water conduction can take 10's to 100's of milliseconds to reach an equilibrium. In electrical terms, this approximates a first order exponential transient as in a simple RC filter. The transient behavior of the water acts in a similar fashion to a battery that is in essence the same mechanism of moving ions in a fluid to store charge.

Figure 2A:
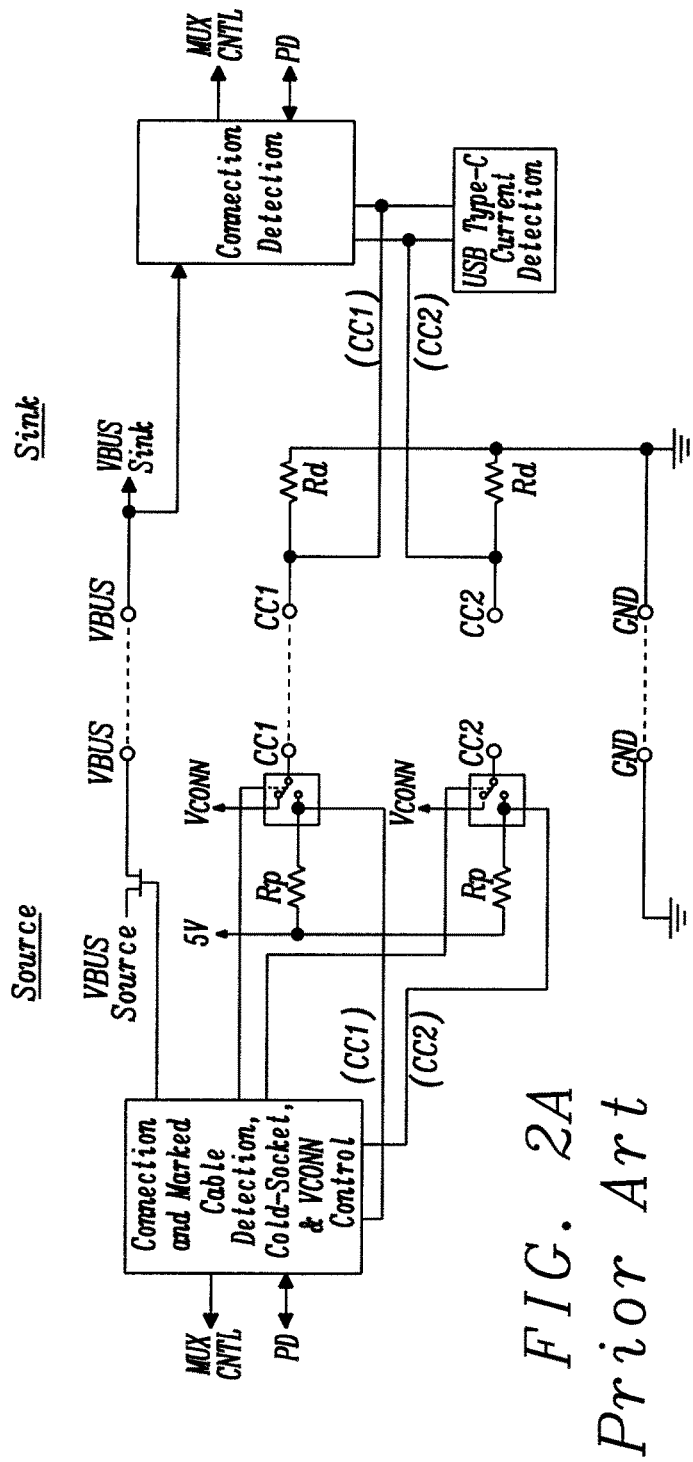
FIG. 2A is a schematic of a Source to Sink Functional Model as shown in FIG. 4-21 on page 170 of the Universal Serial Bus Type-C Cable and Connector Specification.
Figure 2B:
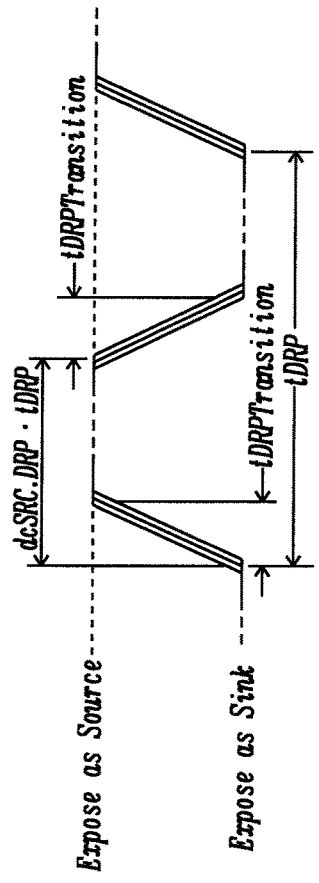
FIG. 2B is a plot of the timing of the alternating between source and sink operation of downstream-facing port (DFP) and the upstream-facing port (UFP) or Dual-Role Port (DRP) of FIG. 4-42 of page 200 of the Universal Serial Bus Type-C Cable and Connector Specification.
Figure 4A:
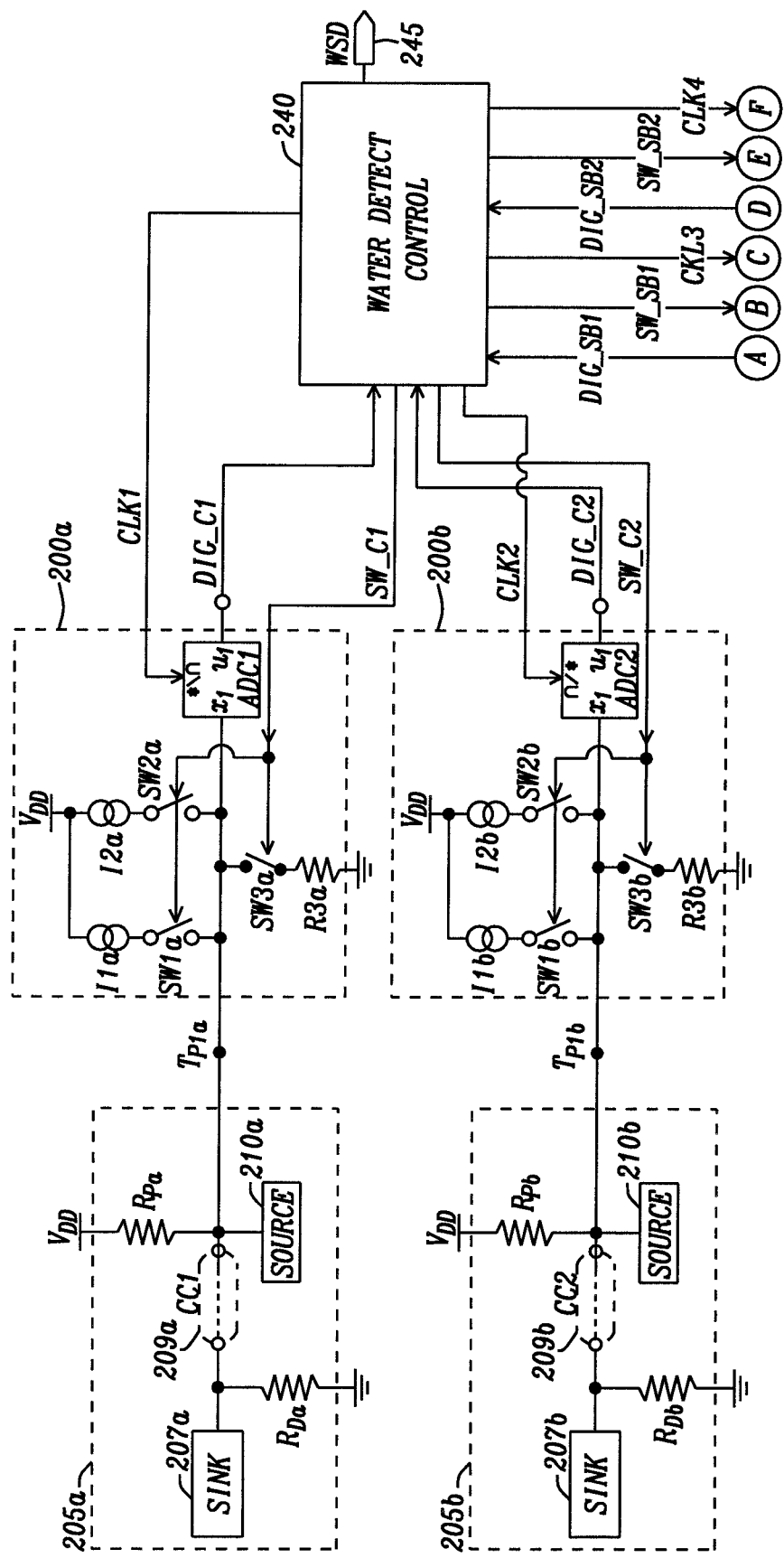
FIGS. 4A and 4B together form a schematic diagram of a leakage conduction path detection circuit embodying the principles of this disclosure.
Figure 4B:
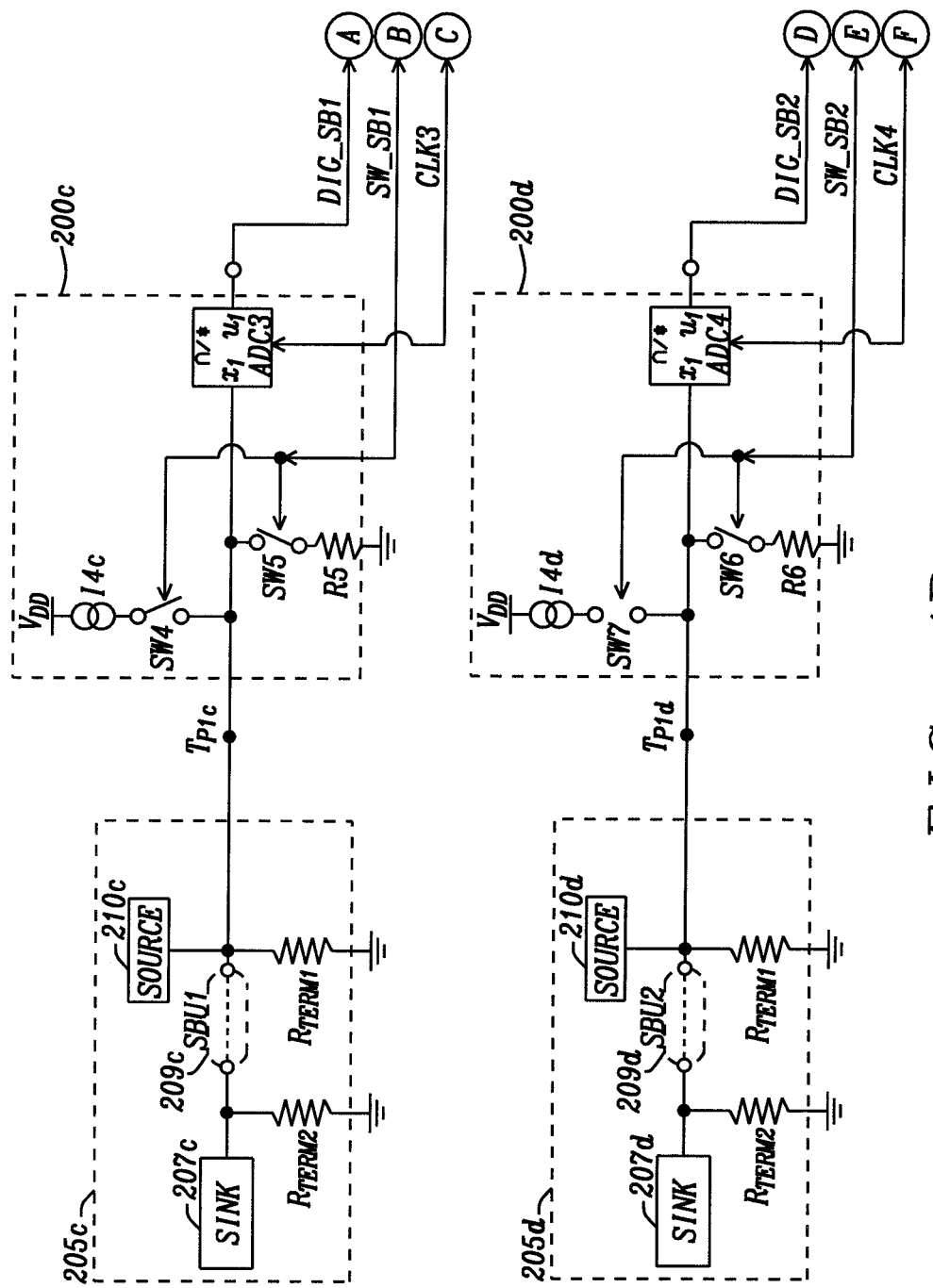

FIGS. 4A and 4B are a schematic diagram of a leakage conduction path detection circuit of this disclosure for the detection of a liquid such as water with impurities (dirt, sweat, etc.) that aid the conduction of electricity. The exemplary connector of this disclosure is the USB Type-C receptacle connector as described in the Universal Serial Bus Type-C Cable and Connector Specification. The detection of the downstream-facing port (DFP) and the upstream-facing port (UFP) is done by sensing the voltage on the $CC_1$ pin and the $CC_2$ pin which is formed by the pull-up resistor Rpa and Rpb at one end and the pull-down resistor RDa and RDb at the other end of the cable connection. How the $CC_1$ pin and the $CC_2$ pin are connected determines the orientation of the cable connection and the type of connection made as described in FIG. 2A.

In FIG. 4A, the leakage conduction path detection circuit 200a is connected to a Communication Connection ($CC_1$) connector cable arrangement 205a and the leakage conduction path detection circuit 200b is connected to a Communication Connection ($CC_2$) connector cable arrangement 205b. The Communication Connection ($CC_1$) connector cable arrangement 205a has a source circuit (a host or hub port) 210a is connected to a connector/cable assembly 209a. The connector/cable assembly 209a has a receptacle connector into which a plug connector is inserted. The plug connector is attached to one end of a cable. The opposite end of the cable is a direct attachment or an attachment to a plug connector that is connected to a receptacle connector of a sink 207a (USB accessory or USB device). A first terminal of a pull up resistor $R_{Pa}$ is connected to the source and to the receptacle connector of the source side of the connector/cable assembly 209a. A second terminal of the pull up resistor $R_{Pa}$ is connected to the power supply voltage source $V_{DD}$. A first terminal of a pull down resistor $R_{Da}$ is connected to the sink 207a and the receptacle connector of the sink 207a side of the connector/cable assembly 209a. A second terminal of the pull down resistor $R_{Da}$ is connected to the ground reference voltage source.

The Communication Connection ($CC_2$) connector cable arrangement 205b has a source circuit (a host or hub port) 210b is connected to a connector/cable assembly 209b. The connector/cable assembly 209b has a receptacle connector into which a plug connector is inserted. The plug connector is attached to one end of a cable. The opposite end of the cable is a direct attachment or an attachment to a plug connector that is connected to a receptacle connector of a sink 207b (USB accessory or USB device). A first terminal of a pull up resistor $R_{Pb}$ is connected to the source and to the receptacle connector of the source side of the connector/cable assembly 209b. A second terminal of the pull up resistor $R_{Pb}$ is connected to the power supply voltage source $V_{DD}$. A first terminal of a pull down resistor $R_{Db}$ is connected to the sink 207b and the receptacle connector of the sink 207b side of the connector/cable assembly 209b. A second terminal of the pull down resistor $R_{Db}$ is connected to the ground reference voltage source.

The leakage conduction path detection circuit 200a has a first current source $I_{1a}$ that has the first terminal connected to the first terminal of a switch SW1a and a second terminal connected to the power supply voltage source $V_{DD}$. The second terminal of the switch SW1a is connected to the terminal $T_{P1a}$ at the output of the leakage conduction path detection circuit 200a. Further, the leakage conduction path detection circuit 200a has a second current source $I_{2a}$ that has one terminal connected to a first terminal of a switch SW2a and a second terminal of the second current source $I_{2a}$ connected to the power supply voltage source $V_{DD}$. The second terminal of the switch SW1a is connected to the terminal $T_{P1a}$ at the output of the leakage conduction path detection circuits 200a. The current provided by the first current source $I_{1a}$ is much smaller than the second current source $I_{2a}$. In the example of the USB Type C connector, the first current source $I_{1a}$ will be used to provide a 1 µa current for detecting the water when there is no connection between the source circuit 210a and the sink 207a. The second current source $I_{2a}$ is used to provide an 80 µa current for detecting the water when there is a connection between the source circuit 210a and the sink circuit 207a. The leakage conduction path detection 200a has a resistor $R_{3a}$ that functions as a current sink with a first terminal connected to a first terminal of a switch SW3a and a second terminal connected to the ground reference voltage source. When the switch SW3a is activated and there is water present on the connector pins of the connector cable arrangement 205a, the resistor $R_{3a}$ discharges any electrical charge present on the water.

The leakage conduction path detection circuit 200b has a first current source $I_{1b}$ that has the first terminal connected to the first terminal of a switch SW1b and a second terminal connected to the power supply voltage source $V_{DD}$. The second terminal of the switch SW1b is connected to the terminal $T_{P1b}$ at the output of the leakage conduction path detection circuit 200b. Further, the leakage conduction path detection circuit 200b has a second current source $I_{2b}$ that has one terminal connected to a first terminal of a switch SW2b and a second terminal of the second current source $I_{2b}$ connected to the power supply voltage source $V_{DD}$. The second terminal of the switch SW1*b* is connected to the terminal $T_{P1b}$ at the output of the leakage conduction path detection circuits 200*b*. The current provided by the first current source $I_{1b}$ is much smaller than the second current source $I_{2b}$. In the example of the USB Type C connector, the first current source $I_{1b}$ will be used to provide a 1 µa current for detecting the water when there is no connection between the source circuit 210*b* and the sink 207*b*. The second current source $I_{2b}$ is used to provide an 80 µa current for detecting the water when there is a connection between the source circuit 210*b* and the sink circuit 207*b*. The leakage conduction path detection 200*b* has a resistor $R_{3b}$ that functions as a current sink with a first terminal connected to a first terminal of a switch SW3*b* and a second terminal connected to the ground reference voltage source. When the switch SW3*b* is activated and there is water present on the connector pins of the connector cable arrangement 205*b*, the resistor $R_{3b}$ discharges any electrical charge present on the water.

The structure of the leakage conduction path detection circuits 200*a* and 200*b* allows the detection of the water on the connector pins when the cable is connected or disconnected between the source circuit 210*a* and 210*b* and the sink circuit 207*a* and 207*b* as in the Communication Connection ($CC_1$ and $CC_2$) connector cable arrangement 205*a* and 205*b*.

In FIG. 4B, the structure of the leakage conduction path detection circuit 200*c* allows the detection of water on the connector pins when the auxiliary signal for side band use (SBU1) connector cable arrangement 205*c* is connected between the source circuit 210*c* and the sink circuit 207*c* as in the Communication Connection ($CC_1$) connector cable arrangement 205*c*. The SBU1 pin in the receptacle connector of the cable assembly 209*c* is attached to the package of the source circuit 210*c*. The SBU1 pin in the receptacle connector of the cable assembly 209*c* is attached to the package of the sink circuit 207*c*. The source circuit 210*c* is connected to a first terminal of a first termination resistor $R_{TERM1}$. The SBU1 pin in the receptacle connector of the connector cable assembly 209*c* is attached to the source circuit 210*c* and is similarly connected to the first terminal of a first termination resistor $R_{TERM1}$. The sink circuit 207*c* is connected to a first terminal of a second termination resistor $R_{TERM2}$. The auxiliary signal for side band use SBU1 pin in the receptacle connector of the connector cable assembly 209*c* is attached to the sink circuit 207*c* and is similarly connected to the first terminal of a second termination resistor $R_{TERM2}$. The second terminal of the first termination resistor $R_{TERM1}$ and the second termination resistor $R_{TERM2}$ are connected to the ground reference voltage source. In the example of the USB Type C connectors, the first termination resistor $R_{TERM1}$ and the second termination resistor $R_{TERM2}$ are specified to be either open or have a termination resistance that is greater than or equal to 950 kΩ to GND. In the example shown in FIG. 4A, the first termination resistor $R_{TERM1}$ and the second termination resistor $R_{TERM2}$ are chosen to be 1.50 MΩ.

The leakage conduction path detection circuit 200*c* has a current source $I_{4c}$ that has the first terminal connected to the first terminal of a switch SW4 and a second terminal connected to the power supply voltage source $V_{DD}$. The second terminal of the switch SW4 is connected to the terminal $T_{P1c}$ at the output of the leakage conduction path detection circuit 200*c*. The current provided by the current source $I_{4c}$, in the example of the USB Type C connector, provides a 1 µa current for detecting water, whether or not there is a connection between the source circuit 210*c* and the sink circuit 207*c*.

The leakage conduction path detection circuit 200*c* has a resistor $R_5$ that functions as a current sink where the first terminal is connected to the first terminal of a switch SW5 and the second terminal connected to the ground reference voltage source. When the switch SW5 is activated and there is water present on the connector pins of the connector cable assembly 209*c*, the resistor $R_5$ discharges any electrical charge present on the water.

The structure of the leakage conduction path detection circuit 200*d* allows the detection of water on the connector pins when the auxiliary signal for side band use (SBU1) connector cable arrangement 205*d* is connected between the source circuit 210*d* and the sink circuit 207*d* as in the Communication Connection ($CC_2$) connector cable arrangement 205*b*. The SBU2 pin in the receptacle connector of the cable assembly 209*d* is attached to the package of the source circuit 210*d*. The SBU2 pin in the receptacle connector of the cable assembly 209*d* is attached to the package of the sink circuit 207*d*. The source circuit 210*d* is connected to a first terminal of a first termination resistor $R_{TERM1}$. The SBU1 pin in the receptacle connector of the connector cable assembly 209*d* is attached to the source circuit 210*c* and is similarly connected to the first terminal of a first termination resistor $R_{TERM1}$. The sink circuit 207*d* is connected to a first terminal of a second termination resistor $R_{TERM2}$. The auxiliary signal for side band use SBU1 pin in the receptacle connector of the connector cable assembly 209*d* is attached to the sink circuit 207*d* and is similarly connected to the first terminal of a second termination resistor $R_{TERM2}$. The second terminal of the first termination resistor $R_{TERM1}$ and the second termination resistor $R_{TERM2}$ are connected to the ground reference voltage source. In the example of the USB Type C connectors, the first termination resistor $R_{TERM1}$ and the second termination resistor $R_{TERM2}$ are specified to be either open or have a termination resistance that is greater than or equal to 950 kΩ to GND. In the example shown in FIG. 4A, the first termination resistor $R_{TERM1}$ and the second termination resistor $R_{TERM2}$ are chosen to be 1.50 MΩ.

The leakage conduction path detection circuit 200*c* has a current source $I_{4c}$ that has the first terminal connected to the first terminal of a switch SW4 and a second terminal connected to the power supply voltage source $V_{DD}$. The second terminal of the switch SW4 is connected to the terminal $T_{P1c}$ at the output of the leakage conduction path detection circuit 200*c*. The current provided by the current source $I_{4c}$, in the example of the USB Type C connector, provides a 1 µa current for detecting water, whether or not there is a connection between the source circuit 210*c* and the sink circuit 207*c*.

The leakage conduction path detection circuit 200*c* has a resistor $R_5$ that functions as a current sink where the first terminal is connected to the first terminal of a switch SW5 and the second terminal connected to the ground reference voltage source. When the switch SW5 is activated and there is water present on the connector pins of the connector cable assembly 209*c*, the resistor $R_5$ discharges any electrical charge present on the water.

The leakage conduction path detection circuit 200*d* has a current source $I_{4d}$ that has the first terminal connected to the first terminal of a switch SW6 and a second terminal connected to the power supply voltage source $V_{DD}$. The second terminal of the switch SW8 is connected to the terminal $T_{P1d}$ at the output of the leakage conduction path detection circuit 200*d*. The current provided by the current source $I_{4d}$, in the example of the USB Type C connector, provides a 1 µa current for detecting water, whether or not there is a connection between the source circuit 210d and the sink circuit 207d.

The leakage conduction path detection circuit 200d has a resistor $R_7$ that functions as a current sink where the first terminal is connected to the first terminal of a switch SW7 and the second terminal connected to the ground reference voltage source. When the switch SW7 is activated and there is water present on the connector pins of the connector cable assembly 209d, the resistor $R_6$ discharges any electrical charge present on the water.

Each of the leakage conduction path detection circuits 200a, 200b, 200c, and 200d respectively have an analog-to-digital converter ADC1, ADC2, ADC3, and ADC4. The input $x_1$ of the ADC1 is connected to the terminal $T_{P1a}$. The input $x_1$ of the ADC2 is connected to the terminal $T_{P1b}$. The input $x_1$ of the ADC3 is connected to the terminal $T_{P1c}$. The input $x_1$ of the ADC4 is connected to the terminal $T_{P1d}$. The analog-to-digital converters ADC1, ADC2, ADC3, and ADC4 each have an output $U_1$ that is connected to an input of the leakage path detection alert controller circuit 240 to provide the voltage measurement data retain in voltage measurement data DIG C1, DIG C2, DIG S1, and DIG S2. The leakage path detection alert controller circuit 240 includes a timing circuit that generates clocking signals CLK1, CLK2, CLK3, and CLK4 for each of the analog-to-digital converters ADC1, ADC2, ADC3, and ADC4. The clocking signals CLK1, CLK2, CLK3, and CLK4 establish the periods at which the analog-to-digital converters ADC1, ADC2, ADC3, and ADC4 sample the voltages respectively at the terminals $T_{P1a}$, $T_{P1b}$, $T_{P1c}$, and $T_{P1d}$. The output of the leakage path detection alert controller circuit 240 provides the water-detect signal 245 that is transferred to the control circuits of the source circuit 210 or the sink circuit 207 to electrically disconnect the cable assembly 209 to protect the cable assembly 209 from metal corrosion.

The leakage path detection alert controller circuit 240 provides switch control signals SW_CC1, for controlling the switches SW1a, SW2a and SW3a; SW_CC2 for controlling the SW1b, SW2b, and SW3b; SW_SB1 for controlling the switches SW4 and SW5; and SW_SB2 for controlling the switches SW6 and SW7. While not shown as such, the switch control signals SW_CC1, SW_CC2, SW_SB1, SW_SB2 are individual control signals for independently activating and deactivating the switches SW1a, SW1b, SW2a, SW2b, SW3a, SW3b, SW4, SW5, SW6, and SW7.

Figure 5:
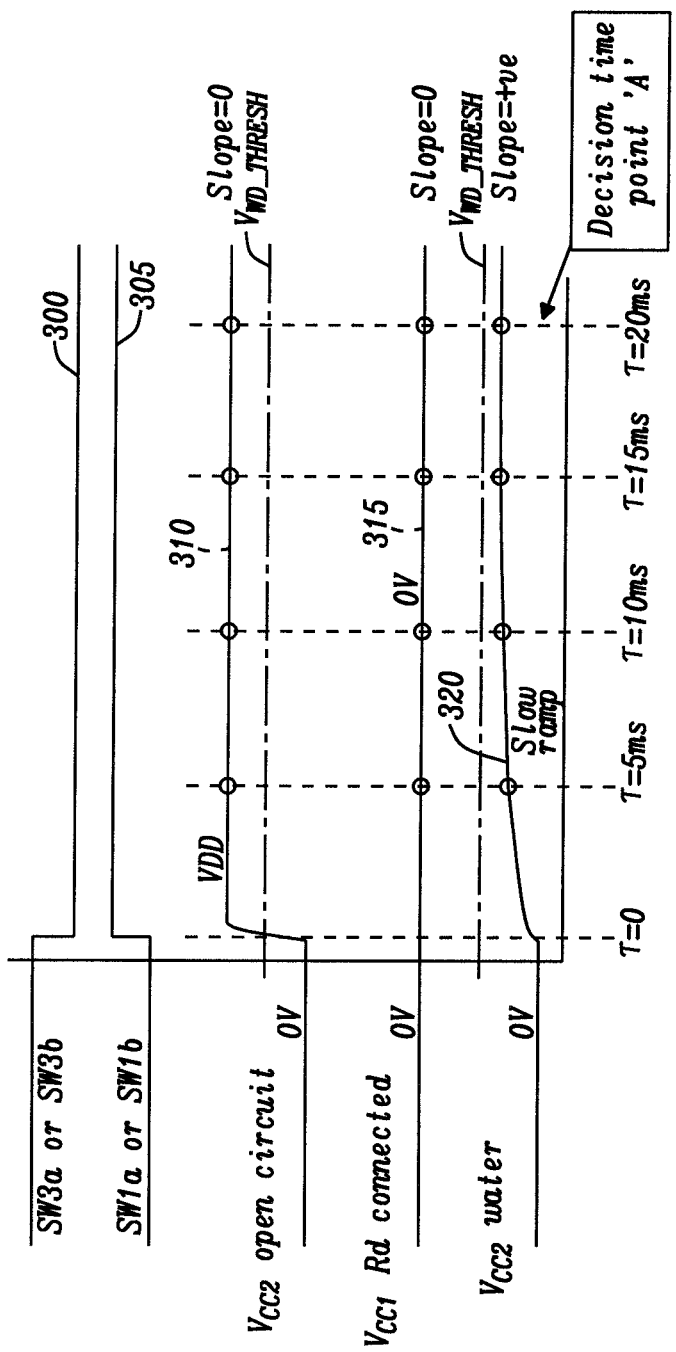
FIGS. 5-8 are plots of the waveforms of test the Communication Connection ($CC_1$ and $CC_2$) pin in a USB Type-C Receptacle connector to determine the presence of a conductive liquid such as water by the leakage conduction path detection circuit embodying the principles of this disclosure.

FIGS. 5-8 are plots of the waveforms of the leakage conduction path detection circuits 200a and 200b of FIGS. 4A and 4B testing of a Communication Connection (CC1 and CC2) pin in the cable assemblies 209c and 209d of a USB Type-C Receptacle connector to determine the presence of water of this disclosure. Referring to FIGS. 4A, 4B and 5, the plot 300 shows that prior to the time τ0, the switch SW3a and/or SW3b is activated such that the first terminal of the resistor $R_{3a}$ and/or $R_{3a}$ is connected to the output of the leakage conduction path detection circuits 200a or 200b. The voltage $V_{CC1}$ and/or $V_{CC2}$ at outputs $T_{P1a}$ and/or $T_{P1b}$ of the leakage conduction path detection circuits 200a and 200b is brought to a ground voltage level through the resistors R3a and/or R3b. The resistors R3a and/or R3b forces the source circuit 210a and/or 210b of the Communication Connection (CC1 and CC2) connector cable arrangement 205a and 205b to be "exposed as a sink".

After the time τ0, the switches SW3a and/or SW3b are deactivated as shown in plot 300 and the switches SW1a and/or SW3b are activated as shown in plot 305. The current sources I1a and/or I1b provide a relatively small current of approximately 1 µA to the cable assembly. If the cable assembly 209b is open, as shown in the Communication Connection (CC2) connector cable arrangement 205b, then the voltage $V_{CC2}$ at output $T_{P1b}$ of the leakage conduction path detection circuits 200b rises relatively instantaneously to the voltage level of the power supply voltage source $V_{DD}$ as shown in plot 310. At the times τ=5 ms, τ=5 ms, τ=10 ms, τ=15 ms, τ=20 ms a voltage sampling is captured by the analog-to-digital converter ADC2 and transferred as a digital word to the leakage path detection alert controller circuit 240. At the time τ=20 ms, the leakage path detection alert controller circuit 240 determines the slope of the plot 310 to be zero, thus indicating that there is no water is in the receptor connector of the source circuit 210b into which the cable assembly 209b is to be plugged.

If the cable assembly 209a is connected, as shown in the Communication Connection (CC1) connector cable arrangement 205a, then the resistor $R_{Da}$ is connected through the cable assembly 209a to the output of the leakage conduction path detection circuits 200a to receive the current from the current source I1a. The 1 µA of the current source I1a is such that the voltage $V_{CC1}$ at output $T_{P1a}$ of the leakage conduction path detection circuits 200a is approximately the voltage level of the ground reference voltage source, as measured at the times τ=5 ms, τ=5 ms, τ=10 ms, τ=15 ms, τ=20 ms as shown in plot 315. The leakage conduction path detection circuit 240 determines that the slope is zero and the value is below the water-detection threshold, $V_{WD\_THRESH}$. At decision time point A, the leakage conduction path detection circuit 240 transitions the plots, as shown in FIG. 7 and discussed hereinafter.

If the cable assembly 209b is open, as shown in the Communication Connection ($CC_2$) connector cable arrangement 205b and there is water present in the connector of the cable assembly 209b attached to the package of the source circuit 210b, the voltage $V_{CC2}$ at output $T_{P1b}$ of the leakage conduction path detection circuits 200b rises relatively slowly to a voltage level less than the water-detection threshold, $V_{WD\_THRESH}$ shown in plot 320. At the times τ=5 ms, τ=5 ms, τ=10 ms, τ=15 ms, τ=20 ms a voltage sampling is captured by the analog-to-digital converter ADC2 and transferred as a digital word to the leakage path detection alert controller circuit 240. At the time τ=20 ms, the leakage path detection alert controller circuit 240 determines the slope of the plot 310 as being greater than zero and the maximum amplitude as less than the water-detection threshold, $V_{WD\_THRESH}$, thus indicating that water is present in the receptacle connector of the cable assembly 209b attached to the package of the source circuit 210. At decision time point A, the leakage conduction path detection circuit 240 transitions to plots as shown in FIG. 7 and discussed hereinafter.

Figure 6:
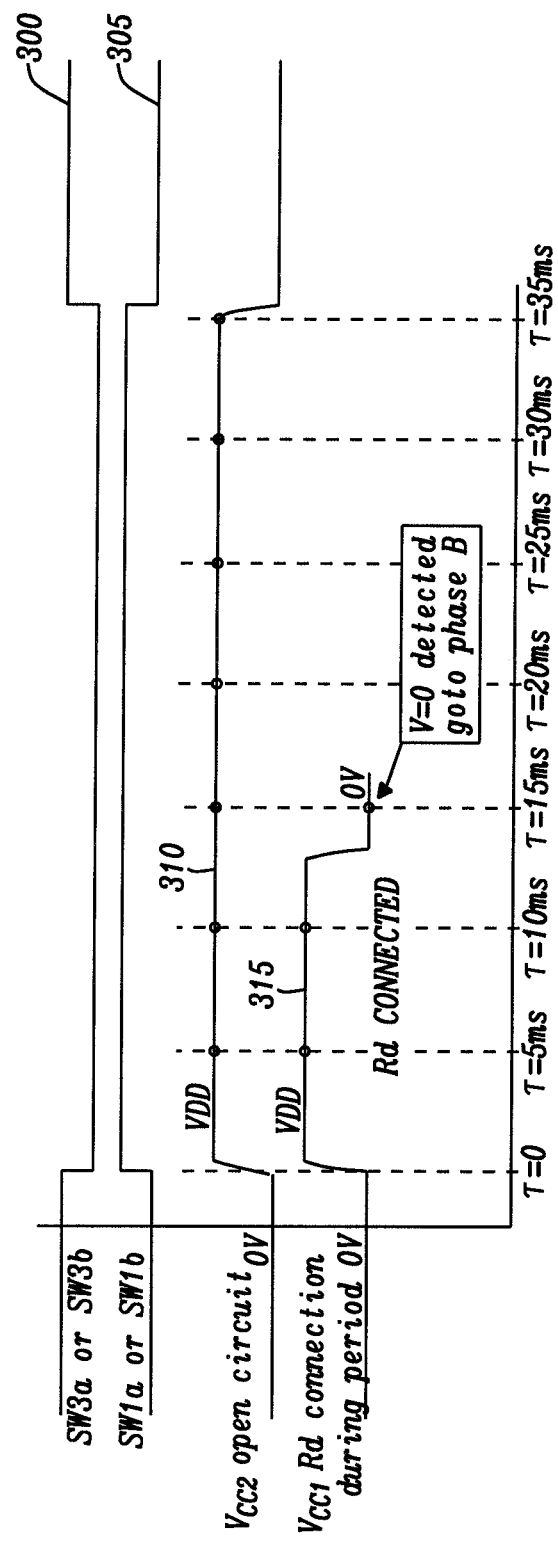

FIG. 6 shows the condition of FIG. 5 where the cable assembly 209a is open as is shown in the Communication Connection ($CC_2$) connector cable arrangement 205b. As shown in plot 310, the voltage $V_{CC2}$ at output $T_{P1b}$ of the leakage conduction path detection circuit 200b rises relatively instantaneously to the voltage level of the power supply voltage source $V_{DD}$. In the plot 315, the cable assembly 209a plug connector is not inserted at the time τ=0 ms and the voltage $V_{CC1}$ at output $T_{P1a}$ of the leakage conduction path detection circuit 200a rises relatively instantaneously to the voltage level of the power supply voltage source $V_{DD}$. At a time between the time τ=10 ms and the time τ=15 ms, the cable assembly 209a plug connector is inserted and completely seated into the receptacle connector that is attached to the package of the source circuit 210a, as shown in plot 315, the resistor $R_{Da}$ is then connected through the cable assembly 209a to the output of the leakage conduction path detection circuits 200a to receive the current from the current source I1a. The 1 µA current from the current source is such that the voltage $V_{CC1}$ at output $T_{P1a}$ of the leakage conduction path detection circuits 200b is approximately the voltage level of the ground reference voltage source, as measured at the times $\tau$=15 ms as shown in plot 315. The leakage conduction path detection circuit 240 determines that the voltage level is below the water-detection threshold, $V_{WD\_THRESH}$. The leakage conduction path detection circuit 240 transitions to plots as shown in FIG. 7.

Figure 7:
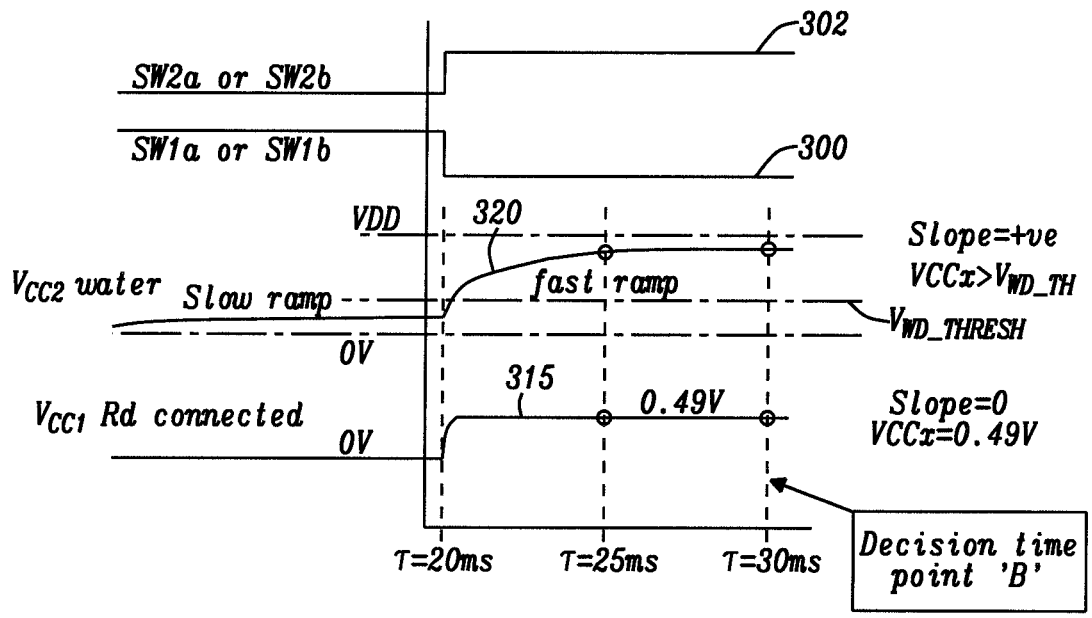

Referring to FIGS. 4 and 7, the decision to be made at this point is whether there is water present on the receptacle connector of the cable assembly 209b or whether there is water where the plug connector of the cable assembly 209b is seated and the resistor $R_{Db}$ is connected to the output $T_{P1b}$ of the leakage conduction path detection circuit 200b. The switch SW1b is deactivated as shown in plot 300 and the switch SW2b is activated as shown in plot 302. At the time $\tau$=20 ms, the first current source I1b is deactivated and the second current source I2b is activated. The second current source I2b then provides the 80 µa current to the cable assembly 209b. If there is water present in the cable receptacle of the cable assembly 209b, the voltage $V_{CC2}$ at output $T_{P1b}$ rises relatively slowly from the time $\tau$=20 ms to the time $\tau$=30 ms with a slope greater than zero to a voltage level less than the power supply voltage source $V_{DD}$ as shown in plot 320. However, if there is no water present and the plug connector of the cable assembly 209a is seated and the resistor $R_{Da}$ is connected to the output $T_{P1a}$, then the voltage $V_{CC1}$ at output $T_{P1a}$ rises relatively instantaneously at the time $\tau$=20 ms to a voltage level of a voltage divider determined by the resistors $R_{Pa}$ and $R_{Da}$. In the instance of the USB type C connector, the voltage of the divider is approximately 0.49V. The slope is now zero and the value is below the water-detection threshold, $V_{WD\_THRESH}$. The water-detection is completed in this instance.

Figure 8:
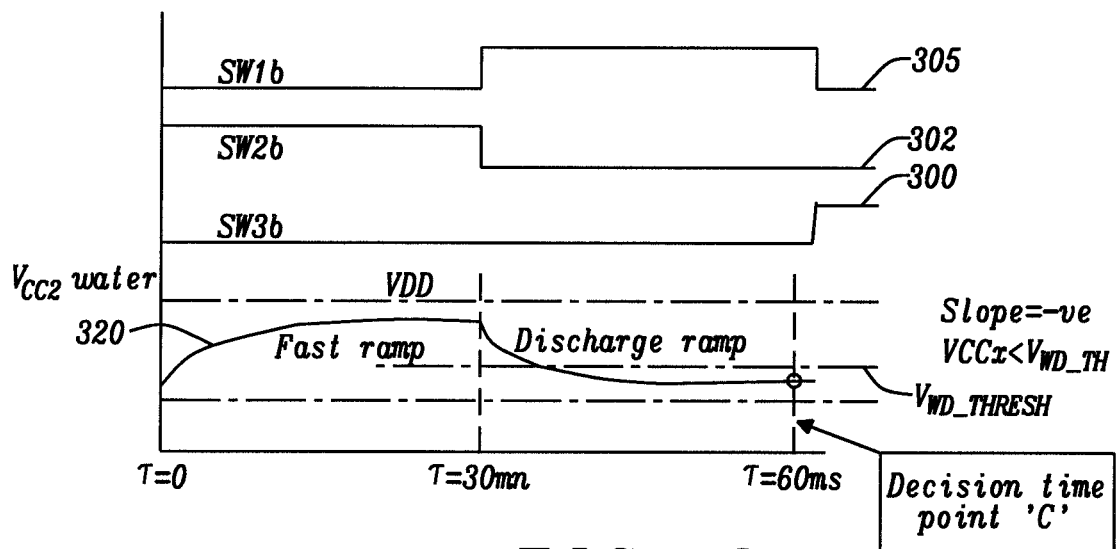

If water is detected, as shown in plot 320, at the decision time B the plots of FIG. 7 transfer to the plots as shown in FIG. 8. Referring to FIGS. 4 and 8, from the time $\tau$=0 to the time $\tau$=30 ms, the voltage $V_{CC2}$ at output $T_{P1b}$ rises relatively slowly with a slope greater than zero to a voltage level less than the power supply voltage source $V_{DD}$ as shown in plot 320 and explained above. At the time $\tau$=30 ms, the switch SW2b is deactivated to switch off the second current source $I_{2b}$ to eliminate the 80 µa current from the cable assembly 209b. The switch S1b is activated to switch on the second current source I2b to provide the 1 µa current to the cable assembly 209b. From the time $\tau$=30 ms to the time $\tau$=60 ms, the voltage $V_{CC2}$ at output $T_{P1b}$ falls relatively slowly with a slope greater than zero to a voltage level less than the water-detection threshold, $V_{WD\_THRESH}$ as shown in plot 320. The voltage sampling is captured by the analog-to-digital converter ADC2 is used by the leakage path detection alert controller 235 to determine the water leakage resistance. At the time $\tau$=60 ms (the decision point C), the leakage path detection alert controller 235 determines if the water leakage loading is below the threshold where it needs to examine the auxiliary signal for side band use (SBU1 and SBU2) pin in a USB Type-C Receptacle connector and transition to phase D as shown in FIG. 9.

The analog-to-digital converter ADC1 and analog-to-digital converter ADC2 readings generated digital word representing the voltage level detected at the output $T_{P1a}$ and the output $T_{P1b}$ of the Communication Connection ($CC_1$) and the Communication Connection ($CC_2$) during the procedure described above that is performed in parallel by the leakage conduction path detection circuits 200a and 200b The decision point C at the time $\tau$=60 ms at the end of the sequence is the voltage detected at the output $T_{P1a}$ and the output $T_{P1b}$ developed on the Communication Connection ($CC_1$) and the Communication Connection ($CC_2$). This voltage is the result of the water conduction and the applied current and is equivalent to Ohms law. Thus, the resulting voltage is the applied current I1a, I1b, I2a, or I2b, multiplied by the conduction 'resistance' at that instant. If the voltage on either Communication Connection ($CC_1$) or the Communication Connection ($CC_2$) pin is lower than the water detect threshold, the water presence is then verified by measuring the voltage present at the voltages respectively at the terminals $T_{P1c}$, and $T_{P1d}$ with the activation of the tests by the leakage conduction path detection circuits 200c and 200d of the auxiliary signals for side band use (SBU1 and SBU2) connector cable arrangements 205c and 205d.

Figure 9:
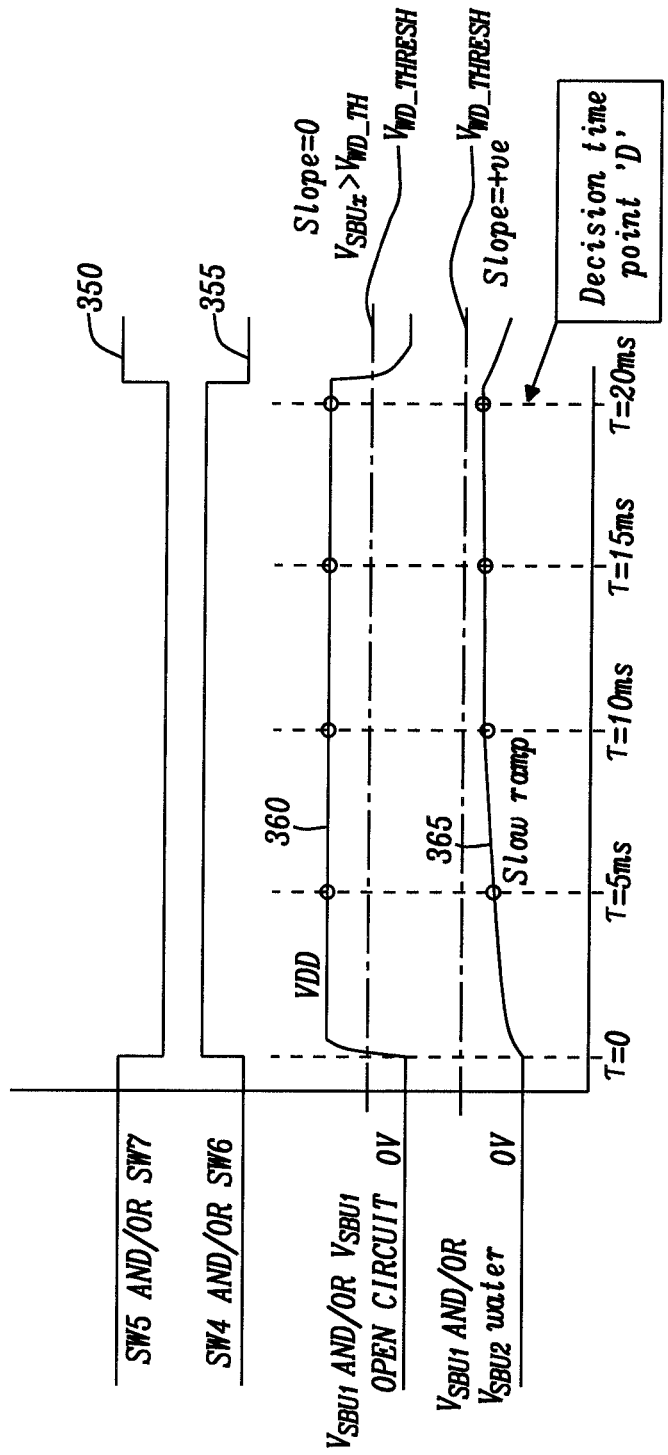
FIG. 9 is a plot of the waveforms of the leakage conduction path detection circuit testing of an auxiliary signal pin for side band use (SBU1 and SBU2) pin in a USB Type-C Receptacle connector to determine the presence of a conductive liquid such as water embodying the principles of this disclosure.

FIG. 9 are plots of the waveforms of the leakage conduction path detection circuit 200c that tests of the SBU1 and SBU2 pins in the receptacle connector of the cable assemblies 209c and 209d to determine the presence of water. Prior to the time $\tau$=0 ms, the switch SW4 is deactivated to disable the current source I4c. The switch SW5 is activated to connect the resistor R5 to the SBU1 pin in the receptacle connector of the cable assembly 209c to discharge any charge from water that may be present on the SBU1 pin in the receptacle connector in the cable assembly 209c. At the time $\tau$=0 ms, the switch S5 is deactivated to disconnect the resistor R5 from the SBU1 pin in the receptacle connector in the cable assembly 209c. The switch SW4 is activated to enable the current source I4c to provide the current I4c to the SBU1 pin in the receptacle connector in the cable assembly 209c for charging any water that may be present on the SBU1pin in the receptacle connector in the cable assembly 209c.

Similarly, prior to the time $\tau$=0 ms, the switch SW6 is deactivated to disable the current source I4d. The switch SW7 is activated to connect the resistor R6 to the SBU2 pin in the receptacle connector of the cable assembly 209d to discharge any charge from water that may be present on the SBU2 pin in the receptacle connector in the cable assembly 209d. At the time $\tau$=0 ms, the switch S7 is deactivated to disconnect the resistor R6 from the SBU2 pin in the receptacle connector in the cable assembly 209d. The switch SW6 is activated to enable the current source I4d to provide the current I4d to the SBU2 pin in the receptacle connector in the cable assembly 209d for charging any water that may be present on the SBU2 pin in the receptacle connector in the cable assembly 209d.

The current source I4c and/or I4d provides a relatively small current of approximately 1 µA to the cable assembly 209c and/or 209d and thus to the first termination resistor $R_{TERM1}$ and the second termination resistor $R_{TERM2}$ which are chosen to be 1.50 MΩ. The voltage $V_{SBU1}$ and/or $V_{SBU2}$ at output $T_{P1C}$ and/or $T_{P1C}$ of the leakage conduction path detection circuits 200c and 200d rises relatively instantaneously to the voltage level of the power supply voltage source $V_{DD}$ as shown in plot 360. At the times $\tau$=5 ms, $\tau$=5 ms, $\tau$=10 ms, $\tau$=15 ms, $\tau$=20 ms a voltage sampling is captured by the analog-to-digital converter ADC3 and/or ADC4 and transferred as a digital word to the leakage path detection alert controller circuit 240. At the time $\tau$=20 ms, the leakage path detection alert controller circuit 240 determines the slope of the plot 310 as being zero, thus indicating that no water is in the receptor connector of the source circuit 210c and/or 210d into which the cable assembly 209c and/or 209d is to be plugged.

If there is water present in the connector of the cable assembly 209c and/or 209d attached to the package of the source circuit 210c and 210d and/or the sink circuit 207c and/or 207d, then the voltage $V_{SBU1}$ and/or $V_{SBU2}$ at output $T_{P1c}$ and/or $T_{P1d}$ of the leakage conduction path detection circuits 200c and/or 200d rises relatively slowly to a voltage level less than the water-detection threshold, $V_{WD\_THRESH}$ shown in plot 365. At the times τ=5 ms, τ=5 ms, τ=10 ms, τ=15 ms, τ=20 ms a voltage sampling is captured by the analog-to-digital converter ADC3 and/or ADC4 and is transferred as a digital word to the leakage path detection alert controller circuit 240. At the time τ=20 ms, the leakage path detection alert controller circuit 240 determines the slope of the plot 365 as being greater than zero and the maximum amplitude as less than the water-detection threshold, $V_{WD\_THRESH}$, thus indicating that water is present in the receptacle connector of the cable assembly 209c and/or 209d attached to the package of the source circuit 210c and/or 210d and/or the sink circuit 207c and/or 207d. At decision time point D, the leakage path detection alert controller circuit 240 confirms that water is present in the receptacle connector of the cable assemblies 209c and/or 209d. The leakage path detection alert controller circuit 240 then transmits a water-detect signal 245 to a control system for a host, peripheral, or dual role device connected to the USB type C cable assembly If the voltage $V_{SBU1}$ and/or $V_{SBU2}$ at output $T_{P1c}$ and/or $T_{P1d}$ of the leakage conduction path detection circuits 200c and/or 200d shows a voltage lower than the water-detection threshold, $V_{WD\_THRESH}$ for the $V_{SBU1}$ and/or $V_{SBU2}$ then the system has determined that water has been detected and the system is alerted, so that the power to the connected can be removed.

Figure 10A:
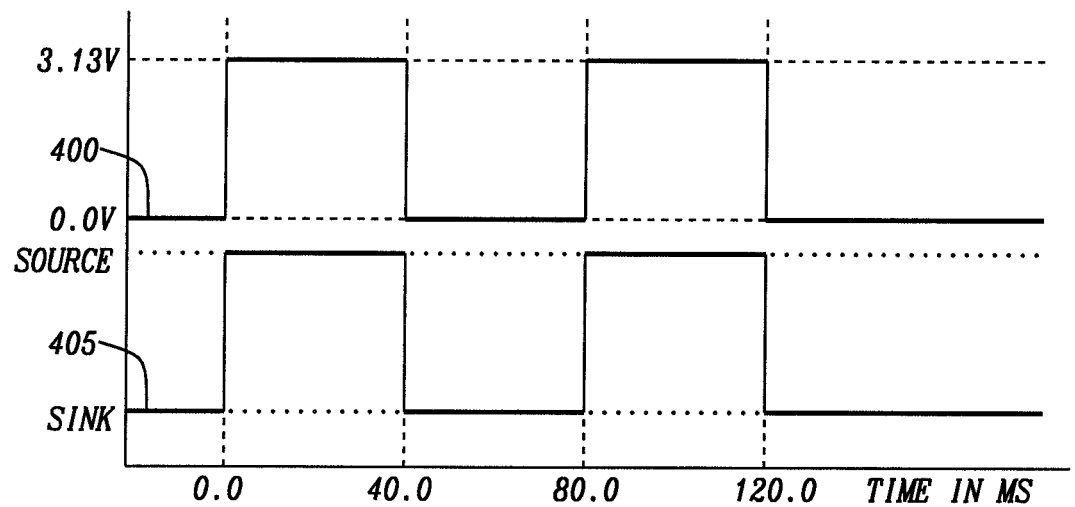
FIGS. 10A, 10B, 10C, and 10D are plots of examples that illustrate the physical operation of the leakage conduction path detection circuit and method embodying the principles of this disclosure.

FIGS. 10A, 10B, 10C, and 10D are plots of examples of implementations that illustrate the physical operation of the leakage conduction path detection circuit and method of this disclosure. In FIG. 10A, the plot 400 represents a connection similar to that shown in FIG. 4b where the cable assembly 209b is open. The plot 405 represents the periods at which the connections are set as a sink or as a source. Referring to FIGS. 4A and 10A, prior to the time τ=0 ms and at the time τ=40 ms and τ=120 ms, the switch SW3b is activated such that the first terminal of the resistor $R_{3b}$ is connected to the output of the leakage conduction path detection circuit 200b. The voltage $V_{CC2}$ at outputs $T_{P1b}$ of the leakage conduction path detection circuits 200b is brought to a ground voltage level through the resistor $R_{3b}$, as shown in plot 400.

At the time τ=0 ms and time τ=80 ms, the switch SW3 is deactivated and the switch SW1b is activated as shown in plot 405. The current source I1b provides a relatively small current of approximately 1 μA to the cable assembly 209b. When the cable assembly 209b is open, as shown in the Communication Connection (CC₂) connector cable arrangement 205b, the voltage $V_{CC2}$ at output $T_{P1b}$ of the leakage conduction path detection circuits 200b rises relatively instantaneously to the voltage level of the power supply voltage source $V_{DD}$ as shown in plot 310 of FIG. 6. The voltage sampling is captured by the analog-to-digital converter ADC2 and transferred as a digital word to the leakage path detection alert controller circuit 240. At the time τ=40 ms, the leakage path detection alert controller circuit 240 determines the slope of the plot 400 as being zero, thus indicating that no water is in the receptor connector of the source circuit 210 into which the cable assembly 209 is to be plugged.

Figure 10B:
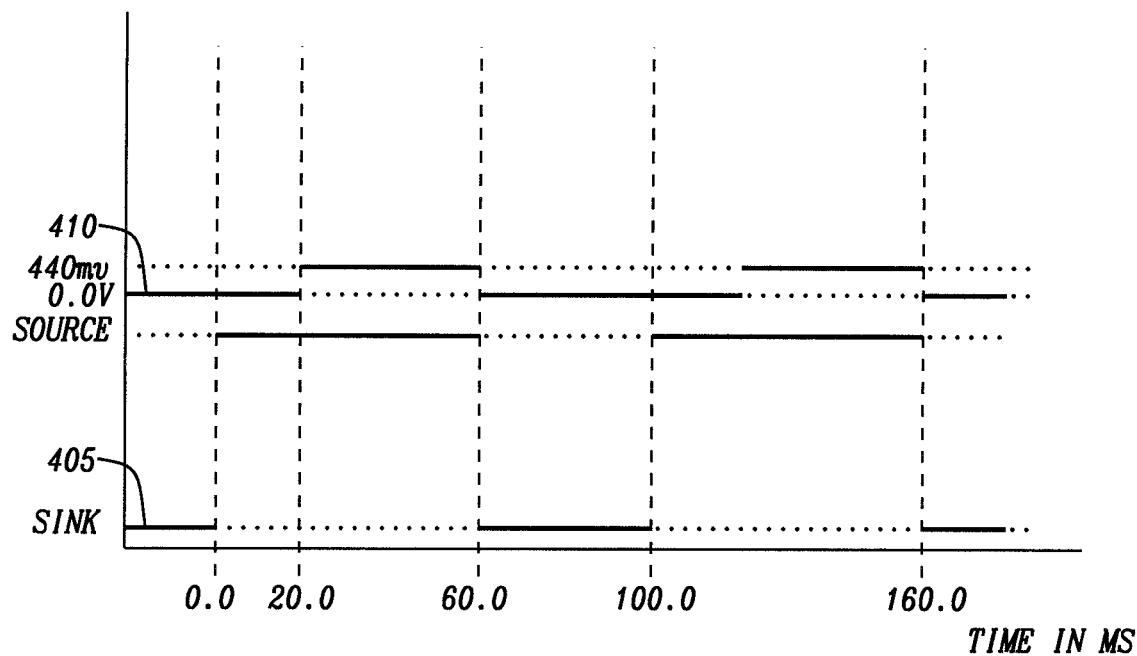

In FIG. 10B, the plot 410 represents a connection similar to that shown in FIG. 4A where the cable assembly 209a has a cable plug connector at each end connected to a receptacle connector at the source 210a and the sink 207a. The plot 405 represents the periods at which the connections are set as a sink or source. Referring to FIGS. 4A and 10B, prior to the time τ=0 ms and at the time τ=40 ms and τ=100 ms, the switch SW3a is activated such that the first terminal of the resistor $R_{3a}$ is connected to the output of the leakage conduction path detection circuit 200a. The voltage $V_{CC1}$ at outputs $T_{P1a}$ of the leakage conduction path detection circuits 200a is brought to a ground voltage level through the resistor $R_{3a}$, as shown in plot 410. When the cable assembly 209a is connected, as shown in the Communication Connection (CC₂) connector cable arrangement 205a, the resistor $R_{Da}$ is thus connected through the cable assembly 209a to the output of the leakage conduction path detection circuits 200a to receive the current from the current source I1a. The 1 μA current from the current source I1a is such that the voltage $V_{CC1}$ at output $T_{P1a}$ of the leakage conduction path detection circuits 200a is approximately the voltage level of the ground reference voltage source, as measured between the times τ=0 ms and τ=20 ms.

At the time τ=20 ms, the first current source I1a is deactivated and the second current source I2a is activated. The second current source I2a then provides the 80 μa current to the cable assembly 209a. Since, there is no water present and the plug connector of the cable assembly 209a is seated and the resistor $R_{Da}$ is connected to the output $T_{P1a}$ such that such that the voltage $V_{CC2}$ at output $T_{P1a}$ rises relatively instantaneously at the time τ=20 ms to a voltage level of a voltage divider determined by the resistors $R_{Pa}$ and $R_{Da}$. In the instance of the USB type C connector, the voltage of the divider is approximately 440 mV. The slope is now zero and the value is below the water-detection threshold, $V_{WD\_THRESH}$.

Figure 10C:
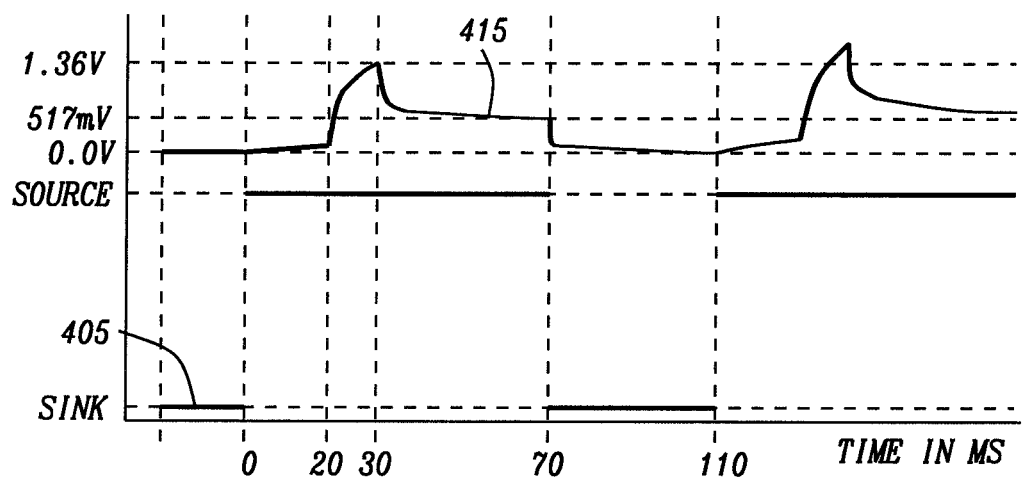

In FIG. 10C, the plot 415 represents a connection similar to that shown in FIG. 4A where the cable assembly 209a has a cable plug connector at each end connected to a receptacle connector at the source 210a and the sink 207a. The plot 405 represents the periods at which the connections are set as a sink or source as shown above. Referring to FIGS. 4A and 10C, prior to the time τ=0 ms and at the time τ=70 ms, the switch SW3a is activated such that the first terminal of the resistor $R_{3a}$ is connected to the output of the leakage conduction path detection circuit 200a. The voltage $V_{CC1}$ at output $T_{P1a}$ of the leakage conduction path detection circuit 200a is brought to a ground voltage level through the resistor R3a, as shown in plot 415. Referring to FIGS. 4A and 10C, prior to the time τ=0 ms and at the time τ=40 ms and τ=100 ms, the switch SW3a is activated such that the first terminal of the resistor $R_{3a}$ is connected to the output of the leakage conduction path detection circuit 200b. The voltage $V_{CC2}$ at outputs $T_{P1a}$ of the leakage conduction path detection circuit 200a is brought to a ground voltage level through the resistor R3a, as shown in plot 410. When the cable assembly 209a is connected, as shown in the Communication Connection (CC₁) connector cable arrangement 205a, the resistor $R_{Da}$ is thus connected through the cable assembly 209a to the output of the leakage conduction path detection circuits 200a to receive the current from the current source I1a. At the time τ=0 ms, the switch SW1a is activated to permit the current source I1a to provide a 1 μA current such that the voltage $V_{CC1}$ at output $T_{P1a}$ of the leakage conduction path detection circuit 200a is approximately the voltage level of the ground reference voltage source, as measured between the times τ=0 ms and τ=20 ms.

At the time τ=20 ms, the first switch SW1a is deactivated to cut off first current source I1a and the second switch SW2a is activated to allow the second current source I2a to provide the 80 μa current to the cable assembly 209a. Now that water is present and the plug connector of the cable assembly 209a is seated and the resistor $R_{Da}$ is connected to the output $T_{P1a}$, the voltage $V_{CC2}$ at output $T_{P1a}$ rises relatively slowly from time τ=20 ms to the time τ=30 ms resulting in a voltage level of approximately 1.36V as determined by the voltage divider formed by the resistors $R_{Pa}$ and $R_{Da}$. At the time τ=30 ms, the second switch SW2a is deactivated to cut off the second current source I2; and the first switch SW1a is activated to allow the first current source I1a to provide the 1 μa current to the cable assembly 209. In the time between time τ=30 ms and the time τ=70 ms, the voltage at the output terminal $T_{P1a}$ decays to a voltage level less than the voltage level of the water-detection threshold, $V_{WD\_THRESH}$. The leakage path detection alert controller 235 determines if the water leakage loading is below the threshold where it needs to examine the auxiliary signal for a side band use (SBU1 and SBU2) pin in a USB Type-C Receptacle connector and transition to phase D as shown in FIG. 10D.

Figure 10D:
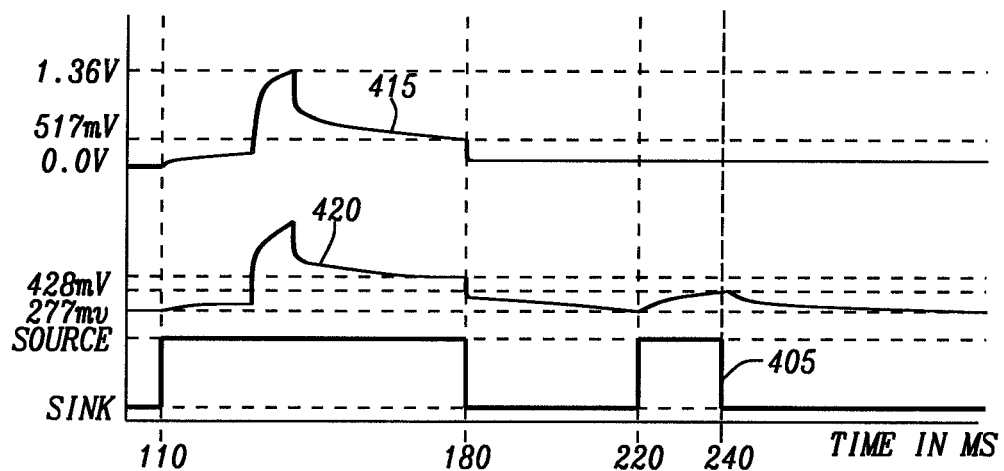

In FIG. 10D, the plot 415 is a replication of the plot 415 of FIG. 10C from the time τ=110 ms to the time τ=180 ms. The plot 405 represents the periods at which the connections are set as a sink or source as shown above. At the time τ=180 ms, the leakage path detection alert controller 235 has determined that the water leakage loading is below the threshold and the water-detection method phase D of the leakage conduction path detection circuit 200c must be executed. The leakage conduction path detection circuit 200 now examines the SBU1 and SBU2 pins in the receptacle connector of the cable assemble 209c and 209d to verify that water is present.

From the time τ=180 ms to the time τ=220 ms, the switches SW5 and/or SW7 are activated to connect the terminal $T_{P1c}$ and/or $T_{P1d}$ to the ground reference voltage source through the resistor R5 and/or R6. In the example of the USB Type-C Receptacle connector of the cable assemblies 209c and/or 209d, the voltage present at the SBU1 and/or SBU2 pins fall to approximately 277 mV as result of the high value of the pull down resistances $R_{TERM1}$ and $R_{TERM1}$. At time τ=220 ms, the switch switches SW5 and/or SW7 are deactivated and the switches SW4 and/or SW67 are activated such that the current sources I4c and/or I4d provide a relatively small current to the terminals $T_{P1c}$ and/or $T_{P1d}$ and thus to the cable assemblies 209c and or 209d as the water charges. The relatively small current (1 μA current) from the time τ=220 ms to the time τ=240 ms indicates a slow ramp to the voltage level of approximately 428 mv. This indicates that water is present on the SBU1 and/or SBU2 pins.

It should be noted that there is significant cross talk from the previous test of the Communication Connection ($CC_1$ and/or ($CC_2$) connector cable arrangement 205a onto the SBU1 and/or SBU2 pin voltage via the conduction of water in the periods from the time τ=110 ms to the time τ=180 ms. This cross talk is similarly due to the high values of the pull down resistances $R_{TERM1}$ and $R_{TERM1}$ (1.5 MΩ). The leakage path detection alert controller circuit 240 determines from the slow ramp voltage at the terminals $T_{P1c}$ and/or $T_{P1d}$, (as encoded by the analog-to-digital converter ADC3 and/or ADC4) that water is present. In instances of the high values of the pull down resistances $R_{TERM1}$ and $R_{TERM1}$, the leakage path detection alert controller circuit 240 could detect water by the presence of the cross talk.

Figure 11A:
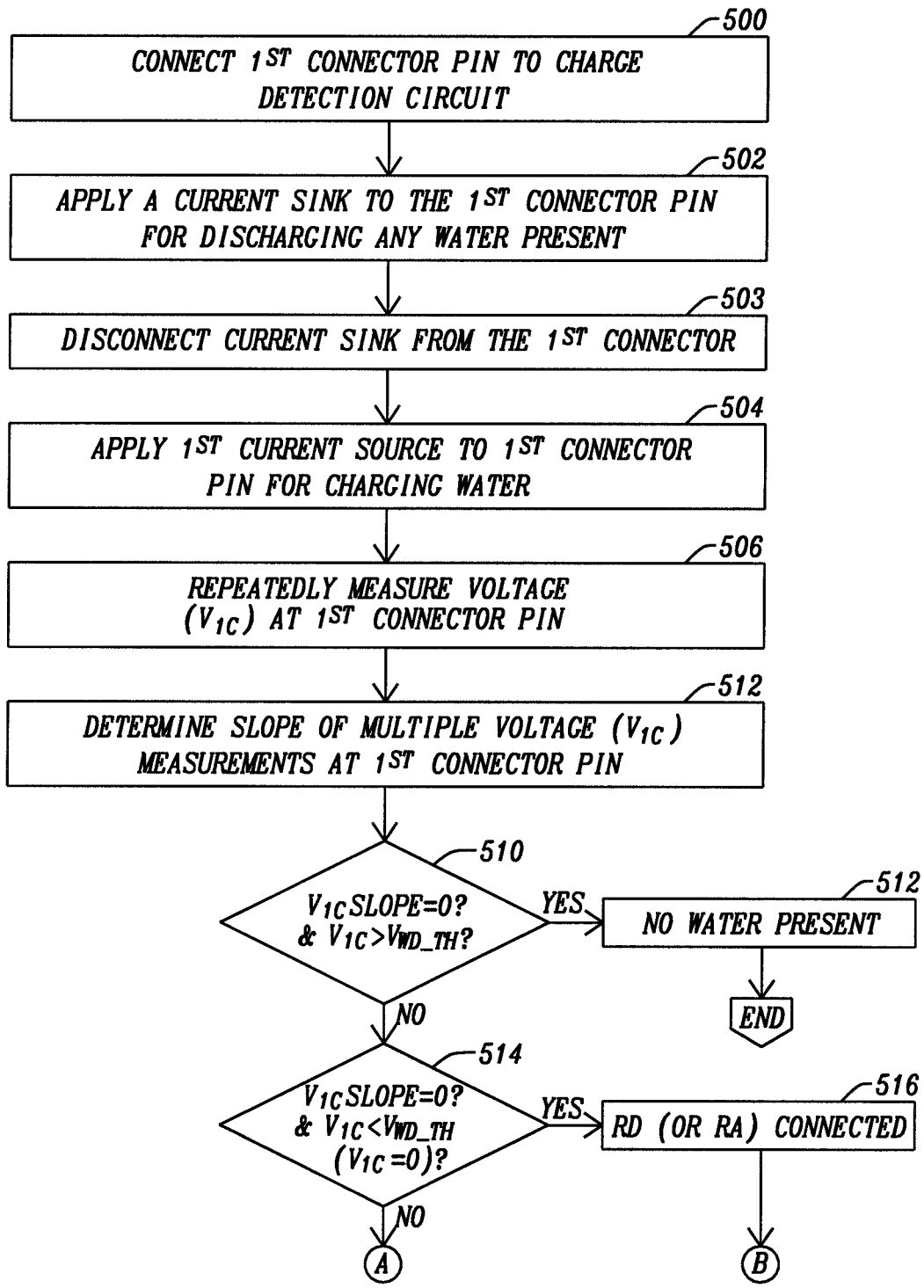
FIGS. 11A, 11B, 11C and 11D are a flow chart illustrating a method for the detection of a leakage conduction path in a receptacle connector or plug embodying the principles of this disclosure.

FIGS. 11A, 11B, 11C and 11D are a flow chart illustrating a method for the detection of water in a receptacle connector or plug of this disclosure. Refer to FIG. 4A for the exemplary components for this method. Referring to FIG. 11A, the method begins with connecting (Box 500) the first connector pin (The Communication Connection ($CC_1$ and $CC_2$ pins) in the connector cable arrangement 205a and 205b to either of the charge detection circuit 200a or 200b. The current sink is applied (Box 502) to the first connector pin. In this example, the current sink is formed by the switches SW3a and SW3b and the resistors R3a and R3b as described above. The application (Box 502) of the current sink is accomplished by the activation of the switches SW3a and SW3b to connect the first terminal of the resistors R3a and R3b to the terminal $T_{P1a}$ or terminal $T_{P1b}$ to discharge any water present on the connector/cable assemblies 209a and or 209b. After the discharge of the first connector pin, the current sink (switches SW3a and SW3b and the resistors R3a and R3b) is disconnected (Box 503) from the first connector pin. The first current sources I1a and I1b are applied (Box 504) to the first connector pins $CC_1$ and $CC_2$ for charging the water. An analog-to-digital converter ADC1 or ADC2 repeatedly captures (Box 506) samples of the voltages $V_{CC1}$ or $V_{CC2}$ at the output terminal $T_{P1a}$ or $T_{P1b}$. The leakage path conduction alert controller 240 receives the samples of the voltages $V_{CC1}$ or $V_{CC2}$ from the analog-to-digital converter ADC1 or ADC2 and determines (Box 508) the slope of the multiple voltages $V_{CC1}$ or $V_{CC2}$ samples at the first connector pin. When the slope of the samples of the voltages $V_{CC1}$ or $V_{CC2}$ is confirmed (Box 510) to be zero and the voltages $V_{CC1}$ or $V_{CC2}$ are determined (Box 510) to be greater than the water-detect threshold voltage $V_{WD\_THRESH}$, then no water is present (Box 512) in the receptacle connector of the connector/cable assemblies 209a and or 209b. If the slope of the samples of the voltages $V_{CC1}$ or $V_{CC2}$ are confirmed (Box 514) to be zero, and if the voltages $V_{CC1}$ or $V_{CC2}$ are confirmed (box 514) to be less than the water-detect threshold voltage $V_{WD\_THRESH}$ at zero volts, then the plug connector of the cable of the connector/cable assemblies 209a or 209b are inserted (Box 516) in the receptacle connector and the sink pull down resistor $R_{Da}$ or $R_{Db}$ are connected to the first connector pin in the receptacle connector of the cable assemblies 209a or 209b.

Figure 11B:
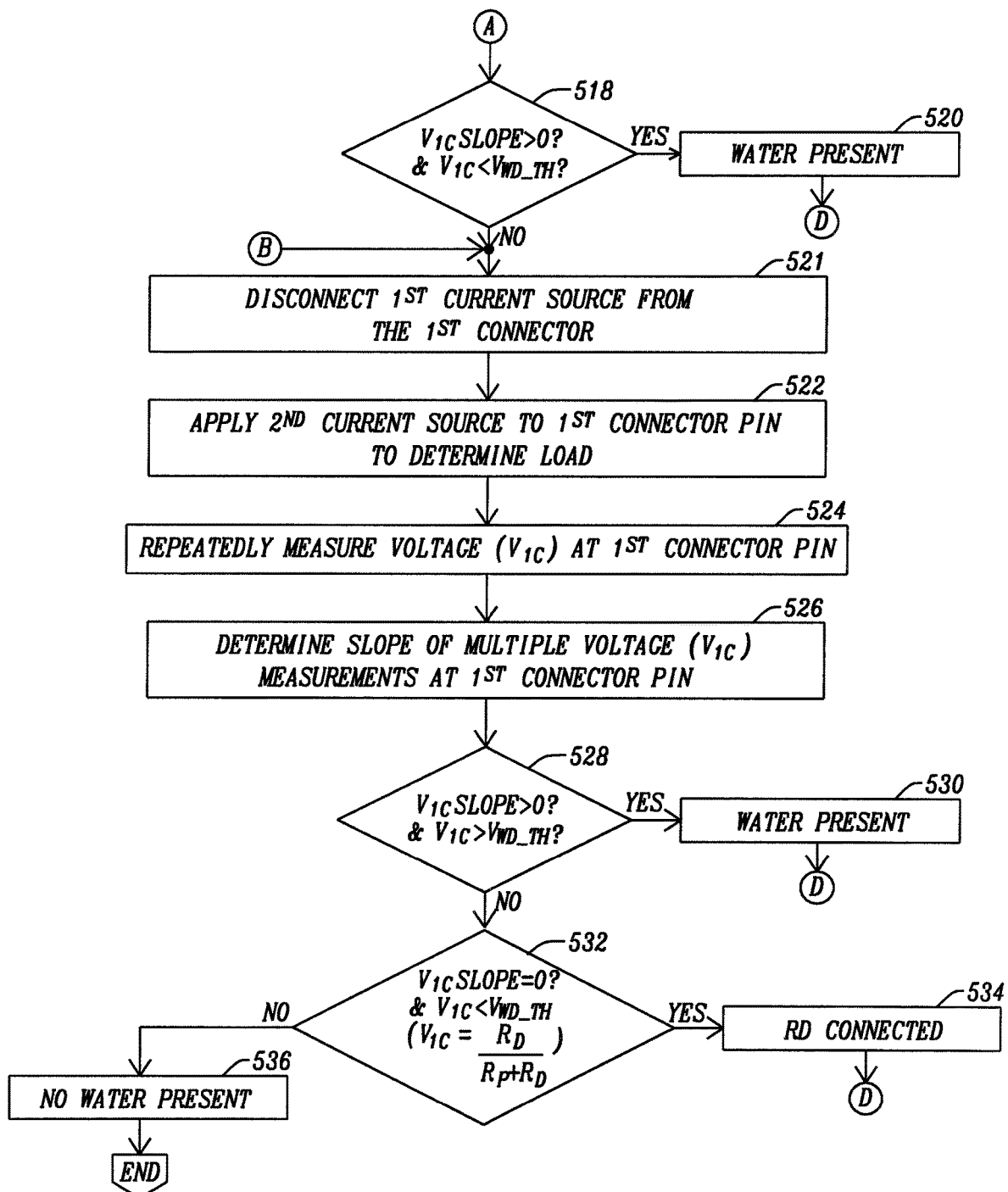

Referring to FIG. 11B, if the slope of the samples of the voltages $V_{CC1}$ or $V_{CC2}$ are confirmed (Boxes 514 and 518) to be greater than zero and the voltages $V_{CC1}$ or $V_{CC2}$ are less than the water-detect threshold voltage $V_{WD\_THRESH}$ and the voltage level of the voltage $V_{1C}$ is greater than zero, then water is present (Box 520) on the receptacle connector of the connector/cable assemblies 209a or 209b.

When the plug connector in the cable of the connector/cable assemblies 209a or 209b are inserted (Box 516) into the receptacle connector and the sink pull down resistor RDa or RDb are connected to the first connector pin in the receptacle connector of the cable of the connector/cable assemblies 209a or 209b or the slope of the samples of the voltage $V_{1C}$ voltages $V_{CC1}$ or $V_{CC2}$ is confirmed (Box 518) to be zero and the voltages $V_{CC1}$ or $V_{CC2}$ are not less than the water-detect threshold voltage $V_{WD\_THRESH}$, the first current source I1a or I1b is disconnected (Box 521) and the second current source I2a or I2b is activated and applied (Box 522) to the first connector pin. The voltages $V_{CC1}$ or $V_{CC2}$ are repeatedly measured (Box 524) at the first connector pin. The leakage path conduction alert control circuit 240 then determines (Box 526) the slope of the multiple measurements of the voltages $V_{CC1}$ or $V_{CC2}$. When the slope of the multiple measurements of the voltages $V_{CC1}$ or $V_{CC2}$ are confirmed (Box 528) to be greater than zero and the voltage level of the voltages $V_{CC1}$ or $V_{CC2}$ are confirmed (Box 528) to be greater than the water-detect threshold voltage $V_{WD\_THRESH}$, water is present (Box 530) on the first connector pin in the receptacle connector.

When the slope of the multiple measurements of the voltages $V_{CC1}$ or $V_{CC2}$ are confirmed (Box 528) to not be greater than zero and the voltage level of the voltages $V_{CC1}$ or $V_{CC2}$ are confirmed (Box 528) to not be greater than the water-detect threshold voltage $V_{WD\_THRESH}$, the slope of the multiple measurements of the voltages $V_{CC1}$ or $V_{CC2}$ are confirmed (Box 532) to be equal to zero and the voltage level of the voltages $V_{CC1}$ or $V_{CC2}$ are confirmed (Box 532) to be less than the water-detect threshold voltage $V_{WD\_THRESH}$. The plug connector is then seated in the receptacle connector of the cable assembly 209 such that the pull down resistor $R_{Da}$ or $R_{DB}$ is connected (Box 534) to the first pin in the receptacle connector.

When the slope of the multiple measurements of the voltages $V_{CC1}$ or $V_{CC2}$ are confirmed (Box 532) to not be equal to zero and the voltage level of the voltages $V_{CC1}$ or $V_{CC2}$ are is confirmed (Box 532) to not be less than the water-detect threshold voltage $V_{WD\_THRESH}$, the receptacle connector is shown (Box 536) to have no water present and the water-detection method is ended.

Figure 11C:
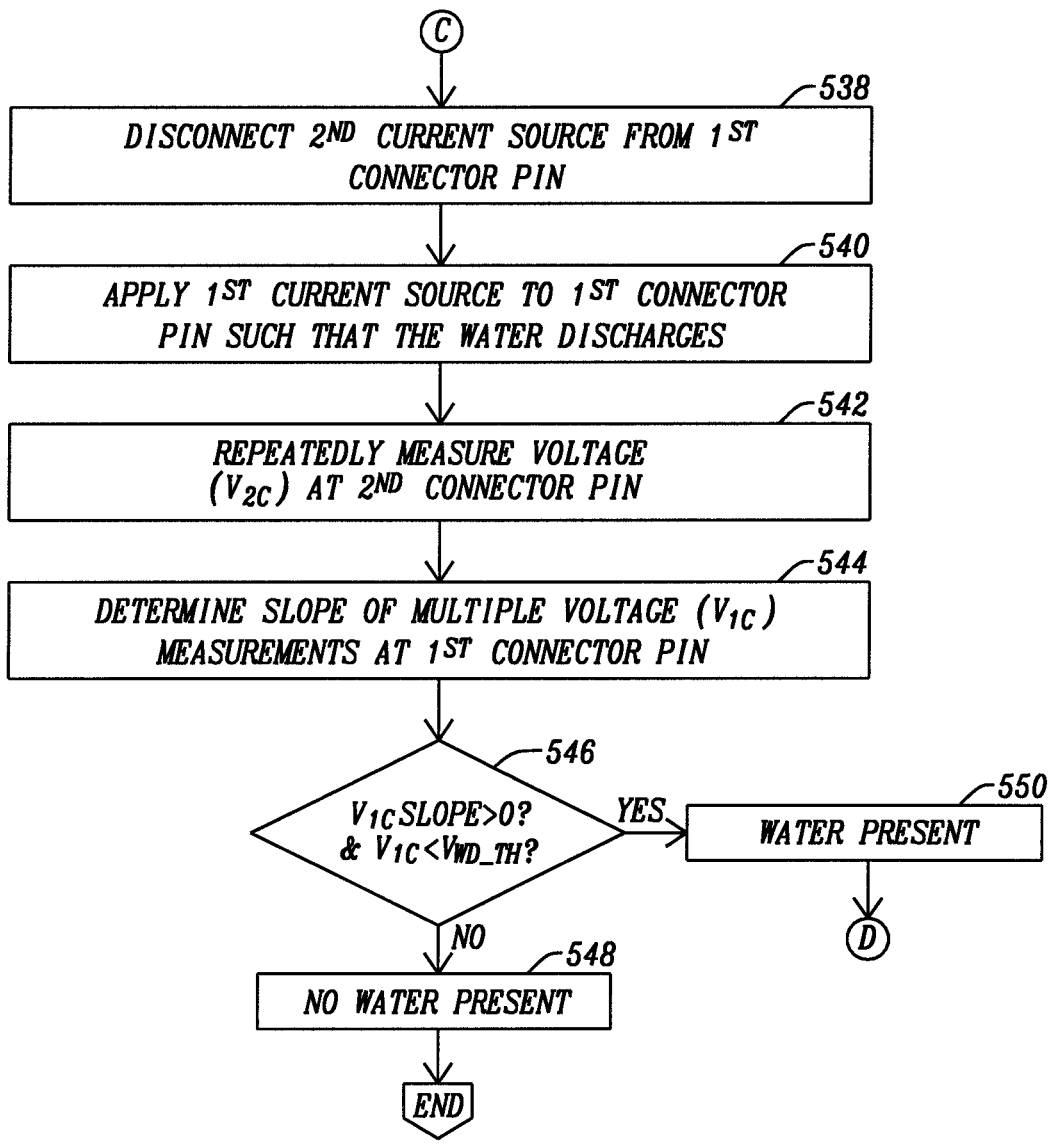

Referring to FIG. 11C, when water is determined to be present (Boxes 520 and 530) in the receptacle connector of the cable assemblies 209a or 209b, the second current source I2a or I2b are disconnected (Box 538) from the first connector of the cable assemblies 209a or 209b to charge any water present in the first connector. The current source I1a or I1b are activated and applied (Box 540) to the first connector pin. The analog-to-digital converter ADC1 or ADC2 repeatedly samples measurements (Box 542) of the voltages $V_{CC1}$ or $V_{CC2}$ at the first connector pin. The leakage path conduction alert controller 240 determines (Box 544) the slope of the repeated multiple measurements of the voltages $V_{CC1}$ or $V_{CC2}$ and the maximum amplitude of the multiple measurements.

When the slope of the multiple measurements of the voltages $V_{CC1}$ or $V_{CC2}$ are confirmed (Box 544) to be not greater zero and the voltage level of the voltages $V_{CC1}$ or $V_{CC2}$ are confirmed (Box 544) to not be less than the water-detect threshold voltage $V_{WD\_THRESH}$, then the receptacle connector is shown (Box 546) to have no water present and the water-detection method is ended. When the slope of the multiple measurements of the voltages $V_{CC1}$ or $V_{CC2}$ are confirmed (Box 544) to be not greater zero and the voltage level of the voltages $V_{CC1}$ or $V_{CC2}$ are confirmed (Box 544) to not be less than the water-detect threshold voltage $V_{WD\_THRESH}$, the receptacle connector is shown (Box 546) to have no water present and the water-detection method is ended.

Figure 11D:
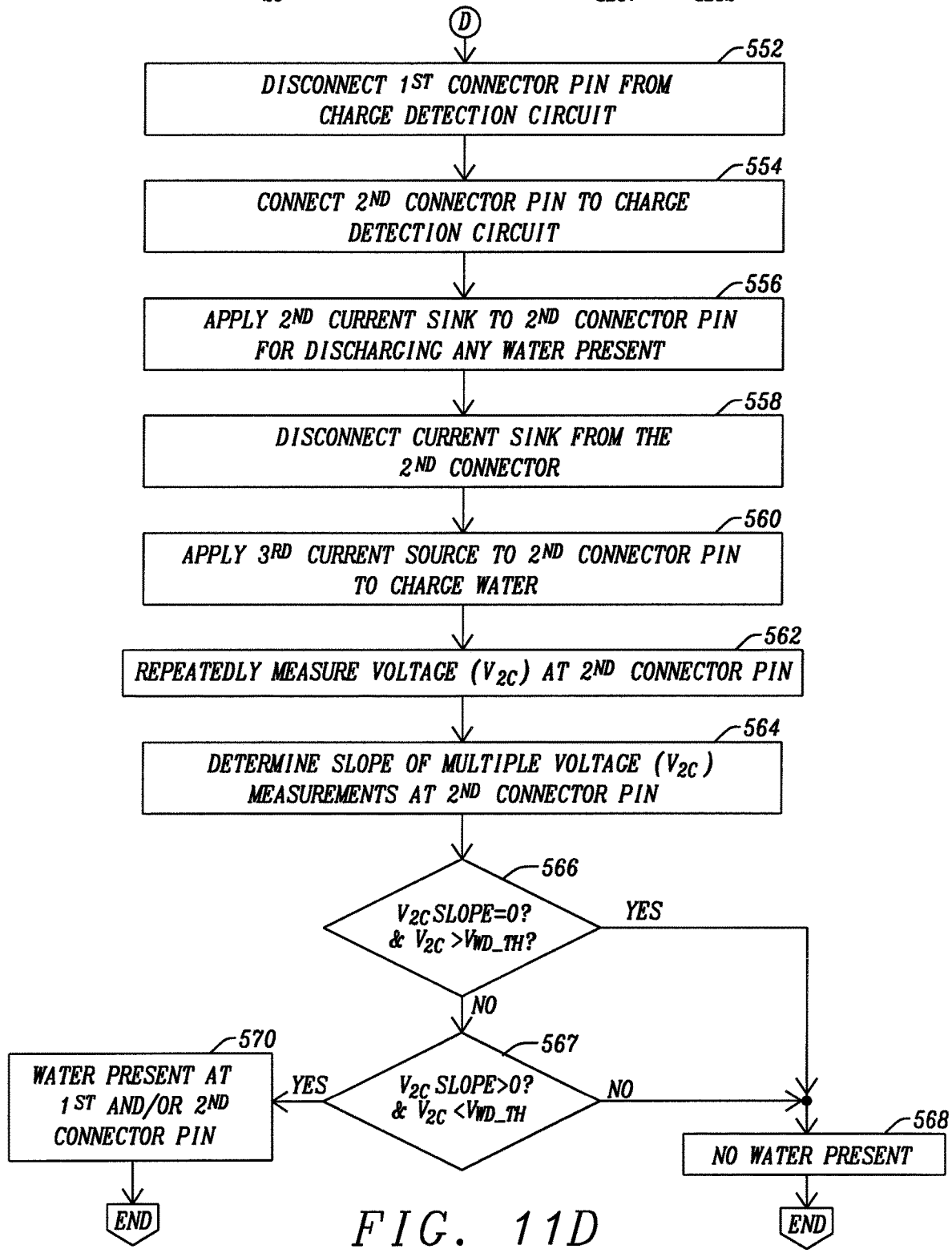

When water is determined to be present (Boxes 520, 530, 548) on the first connector pin, a second connector pin (the auxiliary signal for side band use (SBU1 SBU2) pin in a USB Type-C Receptacle connector) is then tested to verify the fact that water is present in the connector assemblies 209c or 209d. Referring to FIG. 11D, the first connector pin (The Communication Connection ($CC_1$) pin or the Communication Connection ($CC_2$) pin) of the connector cable assemblies 209c or 209d are disconnected (Box 552) from the charge detection circuit 200c or 200d and the second connector pin (auxiliary signals for side band use (SBU1 and SBU2) connector) is connected (Box 554) to the charge detection circuit 200c. A second current sink (the switch SW5 and the resistor R5 or the switch SW7 and the resistor R7) is connected (Box 556) to the second connector pin to remove any charge for the water present on the second connector pin. The current sink is then disconnected (Box 558) from the second connector pin and a third current source I4c or I4d is applied (Box 560) to the second connector. The analog-to-digital converter ADC3 or ADC4 repeatedly samples the measurements (Box 562) of the voltages $V_{SBU1}$ or $V_{SBU2}$ present at the second connector pin. The leakage path conduction alert controller 240 determines (Box 564) the slope of the multiple measurements of the voltages $V_{SBU1}$ or $V_{SBU2}$ present at the second connector pin to determine the maximum measurements of the voltages $V_{SBU1}$ or $V_{SBU2}$. The leakage path conduction alert controller then determines (Box 566) if the slope is equal to zero and if the measurements of the voltages $V_{SBU1}$ or $V_{SBU2}$ are greater than the water-detect threshold voltage $V_{WD\_THRESH}$. If the slope is equal to zero and the measurements of the voltages $V_{SBU1}$ or $V_{SBU2}$ is greater than the water-detect threshold voltage $V_{WD\_THRESH}$, then no water is present on the second connector and the method is ended.

If the slope is not equal to zero and the measurements of the voltages $V_{SBU1}$ or $V_{SBU2}$ is not greater than the water-detect threshold voltage $V_{WD\_THRESH}$, then the leakage path conduction alert controller 240 determines (Box 567) if the slope is greater than zero and the measurements of the voltages $V_{SBU1}$ or $V_{SBU2}$ are less than the water-detect threshold voltage $V_{WD\_THRESH}$. If the slope is greater than zero and the measurements of the voltages $V_{SBU1}$ or $V_{SBU2}$ are less than the water-detect threshold voltage $V_{WD\_THRESH}$, water is present on the first connector and the second connector pins. The leakage path conduction alert controller 240 declares the presence of water on the cable assemblies 209c or 209d to the accessory or device into which the leakage conduction path detection circuit(s) 200a, 200b, 200c, and 200d is implemented. The accessory or device implements the required actions to prevent damage to the cable assemblies 209a, 209b, 209c, and 209d.

In the above, water has been described and in the experiments the water used was deionized, plain tap, or a saline solution. However, any conductive liquid contaminant known in the art may be deposited on the conductor pins of a connector and embody the principles of this disclosure.

The values of the current sources I1a, I1b, I2a, I2b, I4c, and I4d are chosen to enable a sensible voltages $V_{CC1}$, $V_{CC2}$, $V_{SBU1}$ and $V_{SBU}$ for the expected water detection conduction threshold to be sensed. 1 µA gives a sensing range for resistances in the order of 1 MΩ. The 80 µA value of the current sources I2a and I2b is the required value as specified in the Universal Serial Bus Type-C Cable and Connector Specification. The resistors $R_{3a}$, $R_{3a}$, $R_5$, and $R_6$ used for the current sink are also determined by the Universal Serial Bus Type-C Cable and Connector Specification. Other values for the current sources I1a, I1b, I2a, I2b, I4c, and I4d and the current sink resistances $R_{3a}$, $R_{3a}$, $R_5$, and $R_6$ may be employed as determined by the requirements and still be in keeping with the principles of this disclosure.

While this disclosure has been particularly shown and described with reference to the preferred embodiments thereof, it will be understood by those skilled in the art that various changes in form and details may be made without departing from the spirit and scope of the disclosure.

What is claimed is:

1. A leakage conduction path detection circuit configured for detecting a leakage conduction path in a plug connector and/or a receptacle connector of a cable assembly, comprising:

a current sink configured for discharging an electrical charge from any conductive liquid present within one or more pins of the plug connector and/or receptacle connector;

a first current source configured for placing the electrical charge on any conductive liquid present within the receptacle connector;

a first switch is connected between the current sink and one connector pin in the plug connector and/or receptacle connector for selectively connecting the current sink to the connector pin in the plug connector and/or receptacle connector for discharging any conductive liquid present on the connector pin in the receptacle connector;

a second switch is connected between the first current source and the connector pin in the plug connector and/or receptacle connector for selectively connecting the current source to the connector pin for charging the conductive liquid present on the connector pin;

a voltage measurement circuit connected to the connector pin in the plug connector and/or receptacle connector for to determine multiple voltage measurements at the connector pin; and a leakage conduction path detect control circuit in communication with the voltage measurement circuit and configured for receiving and retaining multiple voltage measurement data from the voltage measurement circuit, wherein the leakage conduction path detect control circuit is configured for analyzing the multiple voltage measurement data for determining a slope of the rate of change of the measured voltage present at the connector pin to determine the presence of the conductive liquid based on the slope of change of the voltage and a final voltage level relative to a conductive liquid-detection threshold threshold;

wherein when there is no conductive liquid present, and there is no connection between the receptacle connector and the plug connector on the cable, a voltage at an output of the leakage conduction path detection circuit rises approximately instantaneously to a voltage level of a power supply voltage source, and the slope of the change of the voltage is zero.

2. The leakage conduction path detection circuit of claim 1 wherein the leakage conduction path detection circuit is activated when the cable assembly is connected between a source electronic apparatus and a sink electronic apparatus.

3. The leakage conduction path detection circuit of claim 2 wherein the source and sink electronic apparatus each has a termination resistor.

4. The leakage conduction path detection circuit of claim 2 wherein the source electronic apparatus has a pull-up resistor and the sink electronic apparatus has a pulldown resistor.

5. The leakage conduction path detection circuit of claim 3 wherein the termination resistors have a sufficiently large resistance to be functionally equivalent to an open circuit.

6. The leakage conduction path detection circuit of claim 3 wherein the termination resistors have sufficiently small resistance to be equivalent to the impedance of the cable assembly between the two electronic apparatus.

7. The leakage conduction path detection circuit of claim 1 wherein the plug connector and/or receptacle connector have at least one connector pin.

8. The leakage conduction path detection circuit of claim 1 wherein the plug connector and/or receptacle connector are a USB type C plug connector and/or receptacle connector.

9. The leakage conduction path detection circuit of claim 1 wherein prior to a beginning of a conductive liquid detection cycle, the first switch is activated to connect the current sink to the connector pin in the receptacle connector for eliminating any electrical charge from the connector pin.

10. The leakage conduction path detection circuit of claim 9 wherein at the start of the conductive liquid detection cycle, the conductive liquid detect control circuit deactivates the first switch to disconnect the first current sink from the connector pin and the second switch is activated to connect the first current source to the connector pin.

11. The leakage conduction path detection circuit of claim 1 wherein when the plug connector of the cable assembly is inserted into the receptacle connector of the source electronic apparatus and the sink electronic apparatus has a pull-down termination resistor, the measured voltage remains at essentially a voltage level of a reference voltage source with a zero slope of the rate of change of the voltage.

12. The leakage conduction path detection circuit of claim 5 wherein when the source electronic apparatus and sink electronic apparatus both have termination resistors that have a large resistance and when conductive liquid is present, the slope of the rate of change of the multiple measured voltages is greater than zero with a maximum voltage level that is less than the conductive liquid-detection threshold.

13. The leakage conduction path detection circuit of claim 4 further comprising:
  a second current source configured generating a larger current than the first current for placing the electrical charge on any conductive liquid present within the receptacle connector; and
  a third switch is connected between the second current source and the one connector pin in the plug connector and/or receptacle connector for selectively connecting the second current source to the connector pin in the plug connector and/or receptacle connector for charging any conductive liquid present on the connector pin in the receptacle connector.

14. The leakage conduction path detection circuit of claim 13 wherein when the third switch is activated to connect a second current source to the connector pin in the receptacle connector and when there is a conductive liquid on the connector pin in the receptacle connector, the measured voltage rises with a relatively large slope of the rate of change to the approximately the voltage level of the power supply voltage source and greater than voltage level the conductive liquid-detection threshold.

15. The leakage conduction path detection circuit of claim 14 wherein when verifying the presence of the conductive liquid, the third switch is deactivated to disconnect the second current source from the connector pin and the second switch is activated to connect the first current source to the connector pin and the voltage present at the connector pin begins to discharge.

16. The leakage conduction path detection circuit of claim 15 wherein when the final voltage measurement is sampled and when the voltage present at the connector pin in the receptacle connector is less than the voltage level of the conductive liquid-detection threshold confirms the presence of the conductive liquid.

17. The leakage conduction path detection circuit of claim 16 wherein when subsequent to the final measurement time, the second switch is deactivated to disconnect the first current source from the connector pin and the first switch is activated to connect the current sink to the connector pin to discharge any conductive liquid present at the connector pin.

18. The leakage conduction path detection circuit of claim 1 wherein the receptacle connector and the connector plug comply with the USB Type C specification and the connector pins are configuration channel signal pins (CC1 and CC2) or the auxiliary signal pins for side band use (SBU1, SBU2).

19. An electronic apparatus comprising:
at least one receptacle connector and/or plug connector; and
a leakage conduction path detection circuit connected to at least one receptacle connector or plug connector and configured for detecting a leakage conduction path in a plug connector and/or a receptacle connector of a cable assembly, comprising:
  a current sink configured for discharging an electrical charge from any conductive liquid present within one or more pins of the plug connector and/or receptacle connector;
  a first current source configured for placing the electrical charge on any conductive liquid present within the receptacle connector;
  a first switch is connected between the current sink and one connector pin in the plug connector and/or receptacle connector for selectively connecting the current sink to the connector pin in the plug connector and/or receptacle connector for discharging any conductive liquid present on the connector pin in the receptacle connector;
  a second switch is connected between the first current source and the connector pin in the plug connector and/or receptacle connector for selectively connecting the current source to the connector pin for charging the conductive liquid present on the connector pin;
  a voltage measurement circuit connected to the connector pin in the plug connector and/or receptacle connector for to determine multiple voltages at the connector pin; and
  a leakage conduction path detect control circuit in communication with the voltage measurement circuit and configured for receiving and retaining the multiple voltage measurement data from the voltage measurement circuit, wherein the leakage conduction path detect control circuit is configured for analyzing the multiple voltages measurement data for determining a slope of the rate of change of the multiple measured voltages present at the connector pin to determine the presence of the conductive liquid based on the slope of change of the voltage and a final voltage level relative to a conductive liquid-detection threshold;
  wherein when there is no conductive liquid present and there is no connection between the receptacle connector and the plug connector on the cable, a voltage at an output of the leakage conduction path detection circuit rises approximately instantaneously to a voltage level of a power supply voltage source and the slope of the change of the voltage is zero.

20. The electronic apparatus of claim 19 wherein the leakage conduction path detection circuit is activated when a cable is connected between the electronic apparatus acting as a source and an accessory electronic apparatus.

21. The electronic apparatus of claim 20 wherein the electronic apparatus and the accessory apparatus each have a termination resistor.

22. The electronic apparatus of claim 20 wherein the electronic apparatus has a pull up resistor and the accessory electronic apparatus has a pulldown resistor.

23. The electronic apparatus of claim 21 wherein the termination resistors have a sufficiently large resistance to be functionally equivalent to an open circuit.

24. The electronic apparatus of claim 21 wherein the termination resistors have sufficiently small resistance to be equivalent to the impedance of the cable between the electronic apparatus and the accessory electronic apparatus.

25. The electronic apparatus of claim 19 wherein the plug connector and/or receptacle connector have at least one connector pin.

26. The electronic apparatus of claim 19 wherein the plug connector and/or receptacle connector are a USB type C plug connector and/or receptacle circuit.

27. The electronic apparatus of claim 19 wherein prior to a beginning of a conductive liquid detection cycle, the first switch is activated to connect the current sink to the connector pin in the receptacle connector for eliminating any electrical charge from the connector pin.

28. The electronic apparatus of claim 27 wherein at the start of the conductive liquid detection cycle, the conductive liquid detect control circuit deactivates the first switch to disconnect the first current sink from the connector pin and the second switch is activated to connect the first current source to the connector pin.

29. The electronic apparatus of claim 19 wherein when the plug connector of the cable is inserted into the receptacle connector of the source electronic apparatus and the sink electronic apparatus has a pulldown termination resistor, the measured voltage remains at essentially a voltage level of a reference voltage source with a zero slope of the rate of change of the voltage.

30. The electronic apparatus of claim 23 wherein when the source electronic apparatus and sink electronic apparatus both have termination resistors that have a large resistance and when conductive liquid is present, the slope of the rate of change of the measured voltage greater than zero with a maximum voltage level that is less than the conductive liquid-detection threshold.

31. The electronic apparatus of claim 22 wherein when the source electronic apparatus and sink electronic apparatus both have termination resistors that have a large resistance and when conductive liquid is present, the slope of the rate of change of the multiple measured voltages greater than zero with a maximum voltage level that is less than the conductive liquid-detection threshold.

32. The electronic apparatus of claim 22 further comprising:
  a second current source configured for generating a larger current than the first current for placing the electrical charge on any conductive liquid present within the receptacle connector; and
  a third switch is connected between the second current source and the one connector pin in the plug connector and/or receptacle connector for selectively connecting the second current source to the connector pin in the plug connector and/or receptacle connector for charging any conductive liquid present on the connector pin in the receptacle connector.

33. The electronic apparatus of claim 32 wherein when the third switch is activated to connect to the second current source to the connector pin in the receptacle connector and when there is conductive liquid on the connector pin in the receptacle connector, the multiple measured voltages rises with a relatively large slope of the rate of change to the approximately the voltage level of the power supply voltage source and greater than voltage level the conductive liquid-detection threshold.

34. The electronic apparatus of claim 33 wherein when verifying the presence of the conductive liquid, the third switch is deactivated to disconnect the second current source from the connector pin and the second switch is activated to connect the first current source to the connector pin and the voltage present at the connector pin begins to discharge.

35. The electronic apparatus of claim 33 wherein when the final voltage measurement is sampled and when the voltage present at the connector pin in the receptacle connector is less than the voltage level of the conductive liquid-detection threshold confirms the presence of the conductive liquid.

36. The electronic apparatus of claim 34 wherein when subsequent to the final measurement time, the second switch is deactivated to disconnect the first current source from the connector pin and the first switch is activated to connect the current sink to the connector pin to discharge any conductive liquid present at the connector pin.

37. The electronic apparatus of claim 19 wherein the receptacle connector and the connector plug comply with the USB Type C specification and the connector pins are configuration channel signal pins (CC1 and CC2) or the auxiliary signal pins for side band use (SBU1, SBU2).

38. A method for detecting a conductive liquid present in a receptacle connector and/or a mating connector plug, comprising the steps of:
   discharging an electron charge from any conductive liquid present on a first connector pin in the receptacle connector and/or a mating connector plug;
   charging the conductive liquid present on the first connector pin in the receptacle connector and/or a mating connector plug with the electron charge;
   repeatedly sampling and retaining the samples of measurements of a voltage level present at the first connector pin;
   analyzing the samples of the multiple voltage measurements to determine a slope of the samples of the multiple voltage measurements of a voltage level over time;
   determining when an amplitude of a final measurement of the voltage level is less than a conductive liquid detection threshold Level; and
   applying a second current source to the connector terminal, when the slope of the rate of change of the multiple voltage measurements is a zero value and the voltage level of all the multiple voltage measurements is less than a conductive liquid-detection threshold voltage level.

39. The method for detecting a conductive liquid of claim 38 wherein the discharging the electron charge comprises the step of:
   applying a current sink to the first connector pin in the receptacle connector and/or the mating connector plug to discharge the electron charge from the conductive liquid.

40. The method for detecting a conductive liquid of claim 39 wherein charging the conductive liquid comprises the steps of:
   deactivating the current sink;
   applying a first current source to the first connector pin for charging the conductive liquid present at the first connector pin.

41. The method for detecting a conductive liquid of claim 40 wherein repeatedly sampling and retaining the samples of measurements comprises the step of:
   repeatedly measuring and retaining measurements of the voltage present at the first connector pin.

42. The method for detecting a conductive liquid of claim 41 wherein when the slope of the rate of change of the multiple voltage measurements is a zero value and the voltage level of all the multiple voltage measurements is greater than a conductive liquid-detection threshold voltage level, there is no conductive liquid present and the method is completed.

43. The method for detecting a conductive liquid of claim 38 wherein the second current source has a current level much greater than the first current source.

44. The method for detecting a conductive liquid of claim 43 wherein the second current source has a current level or approximately 80 µA and the first current has a current level of approximately 1 µA.

45. The method for detecting a conductive liquid of claim 38 wherein when the slope of the rate of change is zero and the voltage level of the multiple measurements of the connector terminal is less than the conductive liquid-detection threshold voltage level, there is no conductive liquid present and the methods ends.

46. The method for detecting a conductive liquid of claim 38 wherein when the slope of the rate of change of the multiple voltage measurements is much greater than zero and the multiple voltage measurements are greater than the conductive liquid-detection threshold voltage level, conductive liquid is present on the connector terminal.

47. The method for detecting a conductive liquid of claim 38 comprising the step of:
   testing a second connector pin for determining if the conductive liquid is present to verify the presence of the conductive liquid on the first connector pin.

48. The method for detecting a conductive liquid of claim 47, wherein testing a second connector pin comprises the steps of:
   deactivating the second current source to eliminate the current level of the second current source from the second connector pin;
   activating the current sink to discharge any conductive liquid present on the second connector pin;
   deactivating the current sink once the conductive liquid is discharged;
   activating the first current source to charge the conductive liquid;
   repeatedly measuring and retaining the multiple measurements of the voltage present at the second connector pin; and
   analyzing the samples of the multiple voltage measurements to determine a slope of the samples of the multiple measurements of the voltage level over time.

49. The method for detecting a conductive liquid of claim 48, wherein when the slope of the rate of change of the multiple voltage measurements of the second connector pin is greater than zero and the multiple voltage measurements are less than the conductive liquid-detection threshold, the conductive liquid is present at the first and second connector pins.

* * * * *